US007835974B2

(12) United States Patent
Burgis et al.

(10) Patent No.: US 7,835,974 B2
(45) Date of Patent: *Nov. 16, 2010

(54) SYSTEM AND METHOD FOR MANAGING RISK ASSOCIATED WITH PRODUCT TRANSACTIONS

(75) Inventors: Adam Burgis, London (GB); Lewis C. Findlay, London (GB)

(73) Assignee: Cantor Index, LLC., New York, NY (US)

( * ) Notice: Subject to any disclaimer, the term of this patent is extended or adjusted under 35 U.S.C. 154(b) by 1462 days.

This patent is subject to a terminal disclaimer.

(21) Appl. No.: 10/831,375

(22) Filed: Apr. 23, 2004

(65) Prior Publication Data
US 2004/0230514 A1    Nov. 18, 2004

Related U.S. Application Data

(60) Provisional application No. 60/471,744, filed on May 15, 2003.

(51) Int. Cl.
    G06Q 40/00      (2006.01)
    A63F 9/24      (2006.01)
(52) U.S. Cl. .......................................... 705/37; 463/25
(58) Field of Classification Search .................... 705/37; 463/25
    See application file for complete search history.

(56) References Cited

U.S. PATENT DOCUMENTS

| 5,136,501 | A | | 8/1992 | Silverman et al. ............ 364/408 |
| 5,573,244 | A | * | 11/1996 | Mindes ......................... 463/26 |
| 5,659,731 | A | | 8/1997 | Gustafson |
| 5,842,921 | A | | 12/1998 | Mindes et al. |
| 5,940,811 | A | | 8/1999 | Norris .......................... 705/38 |
| 6,058,379 | A | * | 5/2000 | Odom et al. ................... 705/37 |
| 6,126,543 | A | | 10/2000 | Friedman |
| 6,131,810 | A | | 10/2000 | Weiss et al. .................. 235/379 |
| 6,324,524 | B1 | | 11/2001 | Lent et al. ..................... 705/38 |
| 6,343,278 | B1 | | 1/2002 | Jain et al. |
| 6,371,855 | B1 | * | 4/2002 | Gavriloff ...................... 463/42 |
| 6,390,472 | B1 | | 5/2002 | Vinarsky ..................... 273/278 |
| 6,405,181 | B2 | | 6/2002 | Lent et al. ..................... 705/38 |

(Continued)

FOREIGN PATENT DOCUMENTS

JP      2004252517 A     9/2004

(Continued)

OTHER PUBLICATIONS

Datek Online; *Getting Started*; 3 pages, 2001.

(Continued)

*Primary Examiner*—Jagdish N Patel
*Assistant Examiner*—Kenneth L Bartley
(74) *Attorney, Agent, or Firm*—Glen R. Farbanish

(57) ABSTRACT

A method of managing trading orders is provided. The method includes receiving a request to place a first order to trade a first product, the request being made using an account having one or more current balances. The method further includes determining a risk value for the first order based at least in part on the first product. The method further includes determining whether to approve the first order based at least in part on the risk value determined for the first order and one or more of the current balances for the account, and if the first order is approved, placing the first order.

51 Claims, 16 Drawing Sheets

U.S. PATENT DOCUMENTS

| | | | |
|---|---|---|---|
| 6,408,282 B1 | 6/2002 | Buist | 705/37 |
| 6,421,653 B1 | 7/2002 | May | 705/37 |
| 6,443,841 B1* | 9/2002 | Rossides | 463/25 |
| 6,508,710 B1* | 1/2003 | Paravia et al. | 463/42 |
| 6,709,330 B1 | 3/2004 | Klein et al. | 463/9 |
| 6,910,965 B2 | 6/2005 | Downes | |
| 6,912,510 B1* | 6/2005 | Shepherd | 705/37 |
| 7,020,632 B1* | 3/2006 | Kohls et al. | 705/37 |
| 7,024,386 B1 | 4/2006 | Mills et al. | 705/37 |
| 7,233,922 B2* | 6/2007 | Asher et al. | 705/36 R |
| 7,278,914 B1 | 10/2007 | Marks et al. | |
| 7,454,380 B2* | 11/2008 | Garahi et al. | 705/37 |
| 2001/0003099 A1 | 6/2001 | Von Kohorn | |
| 2001/0028147 A1 | 10/2001 | Ornstein et al. | |
| 2001/0029481 A1* | 10/2001 | Doherty et al. | 705/37 |
| 2001/0037293 A1 | 11/2001 | Hindman et al. | |
| 2001/0039209 A1* | 11/2001 | DeWeese et al. | 463/40 |
| 2002/0007323 A1 | 1/2002 | Tamatsu | 705/26 |
| 2002/0016763 A1 | 2/2002 | March | |
| 2002/0026400 A1 | 2/2002 | Narayan et al. | 705/37 |
| 2002/0069152 A1* | 6/2002 | B.C et al. | 705/37 |
| 2002/0072412 A1 | 6/2002 | Young et al. | |
| 2002/0073018 A1* | 6/2002 | Mulinder et al. | 705/37 |
| 2002/0073021 A1* | 6/2002 | Ginsberg et al. | 705/38 |
| 2002/0087447 A1 | 7/2002 | McDonald et al. | 705/36 |
| 2002/0107781 A1 | 8/2002 | Neyman et al. | 705/37 |
| 2002/0129248 A1 | 9/2002 | Wheeler et al. | |
| 2002/0155885 A1* | 10/2002 | Shvili | 463/25 |
| 2002/0156720 A1 | 10/2002 | Chow et al. | |
| 2002/0174066 A1 | 11/2002 | Kleckner et al. | |
| 2002/0178102 A1 | 11/2002 | Scheinberg et al. | 705/37 |
| 2002/0178115 A1 | 11/2002 | Seo | |
| 2002/0194099 A1 | 12/2002 | Weiss | 705/36 |
| 2002/0194138 A1 | 12/2002 | Dominguez et al. | |
| 2003/0003988 A1 | 1/2003 | Walker et al. | 463/21 |
| 2003/0003990 A1 | 1/2003 | Von Kohorn | |
| 2003/0028476 A1 | 2/2003 | Jenkins et al. | 705/37 |
| 2003/0033232 A1 | 2/2003 | Sugahara | 705/36 |
| 2003/0046218 A1* | 3/2003 | Albanese et al. | 705/37 |
| 2003/0060247 A1 | 3/2003 | Goldberg et al. | |
| 2003/0065805 A1 | 4/2003 | Barnes, Jr. | |
| 2003/0096651 A1* | 5/2003 | Black | 463/42 |
| 2003/0110123 A1 | 6/2003 | Sugano et al. | 705/38 |
| 2003/0144057 A1* | 7/2003 | Brenner et al. | 463/40 |
| 2003/0163404 A1 | 8/2003 | Hu et al. | 705/36 |
| 2003/0195025 A1 | 10/2003 | Hill | |
| 2003/0195841 A1* | 10/2003 | Ginsberg et al. | 705/38 |
| 2003/0207706 A1 | 11/2003 | Potter et al. | |
| 2003/0224854 A1* | 12/2003 | Joao | 463/40 |
| 2004/0015429 A1* | 1/2004 | Tighe et al. | 705/37 |
| 2004/0111358 A1* | 6/2004 | Lange et al. | 705/37 |
| 2004/0128222 A1 | 7/2004 | Turbeville et al. | |
| 2004/0153389 A1* | 8/2004 | Lortscher, Jr. | 705/36 |
| 2004/0193531 A1 | 9/2004 | Amaitis et al. | 705/37 |
| 2004/0204994 A1 | 10/2004 | Olson | 705/14 |
| 2004/0210507 A1* | 10/2004 | Asher et al. | 705/37 |
| 2004/0229671 A1* | 11/2004 | Stronach et al. | 463/6 |
| 2004/0235542 A1* | 11/2004 | Stronach et al. | 463/6 |
| 2005/0003878 A1* | 1/2005 | Updike | 463/16 |
| 2005/0116410 A1* | 6/2005 | Vlazny et al. | 273/139 |
| 2005/0131789 A1* | 6/2005 | Mintz | 705/35 |
| 2005/0181868 A1* | 8/2005 | Vlazny et al. | 463/28 |
| 2006/0038342 A1 | 2/2006 | Lomedico et al. | |
| 2007/0179876 A1 | 8/2007 | Stark | |

FOREIGN PATENT DOCUMENTS

| | | | |
|---|---|---|---|
| JP | 2004287933 A | | 10/2004 |
| WO | WO 0021013 | * | 4/2000 |
| WO | WO02/25407 | | 3/2002 |
| WO | WO02/075491 | | 9/2002 |

OTHER PUBLICATIONS

Chris Lott, et al.; Subject: Regulation—Margin Requirements; 5 pages, May 26, 2002.

United States Patent and Trademark Office: Office Action for U.S. Appl. No. 10/831,501, filed Apr. 23, 2004, in the name of Dominic Crosthwaite, et al.; 20 pages, Nov. 29, 2007.

Roget's II: The New Thesaurus, Third Edition. 1995; http://www.bartleby.com/62/68/S1426800.html; 1 page, accessed Dec. 7, 2007.

United States Patent and Trademark Office: Office Action for U.S. Appl. No. 10/831,616, filed Apr. 23, 2004, in the name of Dominic Crosthwaite; 12 pages, Dec. 12, 2007.

United States Patent and Trademark Office: Office Action for U.S. Appl. No. 10/830,960, filed Apr. 23, 2004, in the name of Dominic Crosthwaite; 18 pages, Dec. 12, 2007.

United States Patent and Trademark Office: Office Action for U.S. Appl. No. 10/831,614, filed Apr. 23, 2004, in the name of Dominic Crosthwaite; 23 pages, Jan. 10, 2008.

Dominic (nmi) Crosthwaite et al., Pending Patent Application Entitled: "System and Method for Establishing and Providing Access to an Online Account," 86 pages, U.S. Appl. No. 10/831,613, Apr. 23, 2004.

Dominic (nmi) Crosthwaite et al., Pending Patent Application Entitled: "System and Method for Establishing and Providing Access to Various Types of Online Accounts," 85 pages, U.S. Appl. No. 10/831,616, Apr. 23, 2004.

Dominic (nmi) Crosthwaite et al., Pending Patent Application Entitled: "System and Method for Providing Access to and Managing Account Activity for an Online Account," 90 pages, U.S. Appl. No. 10/831,501, Apr. 23, 2004.

Dominic (nmi) Crosthwaite et al., Pending Patent Application Entitled: "System and Method for Managing Trading Order Requests", 89 pages, U.S. Appl. No. 10/831,614, Apr. 23, 2004.

Dominic (nmi) Crosthwaite et al., Pending Patent Application Entitled: System and Method for Providing an Intermediary for a Transaction, 85 pages, U.S. Appl. No. 10/830,960, Apr. 23, 2004.

USPTO Office Action Summary for U.S. Appl. No. 10/831,616, filed Apr. 23, 2004; 14 pages, Jul. 16, 2007.

United States Patent and Trademark Office; Office Action for U.S. Appl. No. 10/831,613, filed Apr. 23, 2004 in the name of Dominic Crosthwaite; 16 pages, Feb. 14, 2008.

http://www.tradesports.com; "Tradesports|com The Worlds Leading Sports Trading Exchange Profit from Your Passion." Last visited Jun. 13, 2008.

PCT Search Report for International Application No. PCT/US200/015039;4 pages; Jan. 31, 2006.

U.S. PTO Office Action for U.S. Appl. No. 10/831,501; 24 pages; Jan. 16, 2009.

U.S. PTO Office Action for U.S. Appl. No. 10/830,960; 43 pages; Mar. 18, 2009.

Rogets, Thesaurus, "Speculation".

U.S. PTO Office Action for U.S. Appl. No. 10/831,616; 25 pages; May 26, 2009.

U.S. PTO Office Action for U.S. Appl. No. 10/831,613; 17 pages; Aug. 4, 2009.

U.S. PTO Office Action for U.S. Appl. No. 10/831,616; 14 pages; Sep. 17, 2008.

U.S. PTO Office Action for U.S. Appl. No. 10/831,960; 25 pages; Sep. 3, 2008.

U.S. PTO Office Action for U.S. Appl. No. 10/831,614; 23 pages; Oct. 17, 2008.

U.S. PTO Office Action for U.S. Appl. No. 10/831,613; 18 pages; May 24, 2010.

U.S. PTO Office Action for U.S. Appl. No. 10/831,501; 26 pages; Oct. 27, 2009.

Notice of Allowance for U.S. Appl. No. 10/830,960; 29 pages; Feb. 4, 2010.

AU Examiner Report for Application No. 2004241555; 4 pages; Dec. 10, 2009.

* cited by examiner

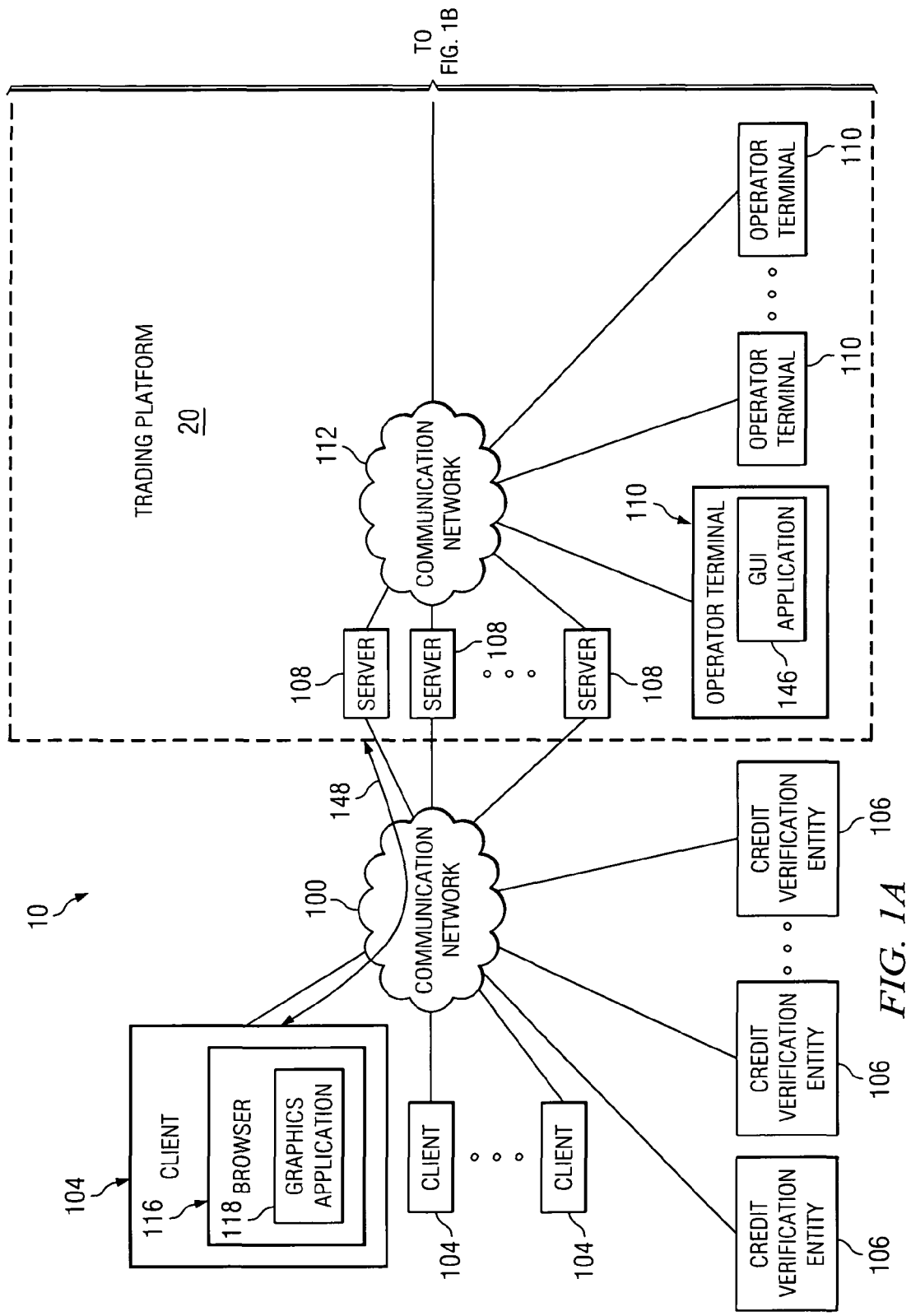

RULES CLASSIFICATION 182

| CLASSIFICATION | DESCRIPTION | DETAILS |
|---|---|---|
| A | INFORMATION ONLY | TRAINING EXCHANGE WILL USE THIS INFORMATION FOR INFORMATION PURPOSES ONLY. THE INFORMATION WILL NOT AFFECT THE APPROVAL DECISION |
| B | NO CREDIT ACCOUNT | THE USER PROSPECT CANNOT BE APPROVED FOR A CREDIT ACCOUNT AND MAY AT THE MOST QUALIFY FOR A DEPOSIT ACCOUNT |
| C | REFER USER | THE ACCOUNT APPLICATION WILL BE REFERRED TO CUSTOMER SERVICES FOR A REVIEW AND THEREFORE AN APPROVAL DECISION WILL NOT BE MADE ON LINE |

IDENTITY CHECK RULES 184

| RULES CLASSIFICATION | REASON CODE | SHORT DESCRIPTION | FULL DESCRIPTION |
|---|---|---|---|
| A | RR01 | VERIFIED MINIMUM 2 + 2 | THE IDENTITY AND ADDRESS OF THE USER PROSPECT HAVE EACH BEEN VERIFIED ON A MINIMUM OF TWO INDEPENDENT DATABASES |
| A | RR02 | VERIFIED MINIMUM 1 + 1 | THE IDENTITY AND ADDRESS OF THE USER PROSPECT HAVE EACH BEEN VERIFIED ON A MINIMUM OF ONE INDEPENDENT DATABASE |
| A | RR03 | NOT VERIFIED 2 + 2 | THE IDENTITY AND/OR ADDRESS OF THE USER PROSPECT HAS NOT BEEN VERIFIED ON A MINIMUM OF TWO INDEPENDENT DATABASES EACH |
| C | RR04 | NOT VERIFIED 1 + 1 | THE IDENTITY AND/OR ADDRESS OF THE USER PROSPECT HAS NOT BEEN VERIFIED ON A MINIMUM OF ONE INDEPENDENT DATABASE EACH |
| A | RR08 | VERIFIED DOB | THE DATE OF BIRTH OF THE USER PROSPECT HAS BEEN VERIFIED WITH NO INCONSISTENCIES |
| A | RR09 | VERIFIED DOB WITH INCONSISTENCIES | THE DATE OF BIRTH OF THE USER PROSPECT HAS BEEN VERIFIED WITH INCONSISTENCIES |
| C | RR11 | BANKRUPTCY DATA PRESENT | INFORMATION REGARDING A BANKRUPTCY FILED BY THE USER PROSPECT HAS BEEN IDENTIFIED |

FROM FIG. 4A

| | RULES CLASSIFICATION | REASON CODE | SHORT DESCRIPTION | FULL DESCRIPTION |
|---|---|---|---|---|
| CREDIT CHECK RULES 186 | A | RR02 | NOTICE OF CORRECTION | A NOTICE OF CORRECTION HAS BEEN IDENTIFIED FOR ANY NAME AT THE USER PROSPECT'S CURRENT OR PREVIOUS ADDRESS |
| | A | RR03 | SATISFIED JUDGMENT | A SATISFIED JUDGMENT HAS BEEN IDENTIFIED FOR ANY NAME AT THE USER PROSPECT'S CURRENT OR PREVIOUS ADDRESS |
| | C | RR06 | NO TRACE OF ADDRESS | NONE OF THE ADDRESSES FOR THE USER PROSPECT ARE FOUND ON THE POSTAL ADDRESS FILE OR VOTER ROLES |
| | B | RR09 | BANKRUPTCY INFORMATION | BANKRUPTCY INFORMATION HAS BEEN IDENTIFIED FOR ANY NAME AT THE USER PROSPECT'S CURRENT OR PREVIOUS ADDRESS |
| | A | RR27 | 3+ SEARCHES WITHIN LAST THREE MONTHS | THREE OR MORE SEARCHES PERFORMED WITHIN THE LAST THREE MONTHS FOR THE USER PROSPECT HAVE BEEN IDENTIFIED |
| | A | RR31 | NOT CONFIRMED ON VOTER ROLLS AT PREVIOUS ADDRESS | THE USER PROSPECT IS NOT CONFIRMED ON THE VOTER ROLES AT THE PREVIOUS ADDRESS |
| | A | RR32 | NOT CONFIRMED ON VOTER ROLLS | THE USER PROSPECT IS NOT CONFIRMED ON THE VOTER ROLES AT THE CURRENT ADDRESS |

| | |
|---|---|
| 1 | CURRENT CASH BALANCE ~ 600B<br>= INITIAL CASH BALANCE ~ 600A<br>± REALIZED GAINS/LOSSES ± DEPOSITS/WITHDRAWALS |
| 2A | 608<br>(IF UNREALIZED PROFITS/LOSSES BALANCE < 0):<br>AVAILABLE CREDIT BALANCE ~ 602B<br>= CREDIT LIMIT ~ 602A<br>- UNREALIZED PROFITS/LOSSES BALANCE ~ 608 |
| 2B | 608<br>(IF UNREALIZED PROFITS/LOSSES BALANCE ≥ 0):<br>AVAILABLE CREDIT BALANCE ~ 602B<br>= CREDIT LIMIT ~ 602A |
| 3 | AVAILABLE WAIVED MARGIN BALANCE ~ 604B<br>= INITIAL WAIVED MARGIN BALANCE ~ 604A<br>- USED MARGIN BALANCE ~ 612 |
| 4 | AVAILABLE TOTAL MARGIN BALANCE ~ 606B<br>= MAXIMUM TOTAL MARGIN BALANCE ~ 606A<br>- USED MARGIN BALANCE ~ 612 |

| CREDIT CHECK | \multicolumn{9}{c}{SCENARIO 510} | |
|---|---|---|---|---|---|---|---|---|---|
| | 1 | 2 | 3 | 4 | 5 | 6 | 7 | 8 | 9 |
| 1. AVAILABLE TOTAL MARGIN ~ 606B ≧ RISK VALUE ~ 332 | N | Y | Y | Y | Y | Y | Y | Y | Y |
| 2. AVAILABLE WAIVED MARGIN ~ 604B ≧ RISK VALUE ~ 332 | | Y | Y | N | N | Y | Y | N | N |
| 3. AVAILABLE CREDIT ~ 602B ≧ 0 | | Y | Y | Y | Y | N | N | N | N |
| 4. AVAILABLE CREDIT ~ 602B + AVAILABLE WAIVED MARGIN ~ 604B + AVAILABLE CASH ~ 600B + GUARANTEED PROFITS ~ 610 ≧ RISK VALUE ~ 332 | | Y | N | CB | | CB | | Y | N |
| 5. AVAILABLE CREDIT ~ 602B + AVAILABLE CASH ~ 600B + GUARANTEED PROFITS ~ 610 ≧ 0 | | CB | | Y | N | CB | | CB | |
| 6. AVAILABLE WAIVED MARGIN ~ 604B + AVAILABLE CASH ~ 600B + GUARANTEED PROFITS ~ 610 ≧ RISK VALUE ~ 332 | | CB | | CB | | Y | N | CB | |
| DECISION | REJECT | APPROVE | REJECT | APPROVE | REJECT | APPROVE | REJECT | APPROVE | REJECT |

FIG. 5B

| MARGIN CALL | | Scenario 1 | 2 | 3 | 4 | 5 | 6 |
|---|---|---|---|---|---|---|---|
| 522 { | MARGIN CALL EQUATIONS | | | | | | |
| | AVAILABLE CASH + GUARANTEED PROFITS ≧ 0 ~600B ~610 | N | N | N | Y | Y | Y |
| | AVAILABLE CREDIT ≧ 0 ~602B | N | Y | Y | Y | N | N |
| | AVAILABLE CREDIT + AVAILABLE CASH + GUARANTEED PROFITS ≧ 0 ~602B ~600B ~610 | | Y | N | | Y | N |
| 524 { | TYPE OF MARGIN CALL | | | | | | |
| | AVAILABLE CASH + AVAILABLE CREDIT – 50% CREDIT LIMIT ~600B ~602B ~602A | X | | | | | |
| | AVAILABLE CASH ~600B | | | X | | | |
| | NO MARGIN CALL | | X | | X | X | X |
| 526 { | AVAILABLE FOR TRADING | | | | | | |
| | MAX (0,MIN(AVAILABLE WAIVED MARGIN + AVAILABLE CASH, ~600B AVAILABLE TOTAL MARGIN)) ~606B ~604B | | X | | X | | |
| | MAX (0,MIN(AVAILABLE WAIVED MARGIN ~604B + AVAILABLE CREDIT ~602B + AVAILABLE CASH, ~600B AVAILABLE TOTAL MARGIN)) ~606B | | | X | | X | |
| | ZERO | X | | | | | X |

FIG. 5C

| | EXAMPLE DETERMINATIONS | SCENARIO | | | | | | | |
|---|---|---|---|---|---|---|---|---|---|
| | | 1 | 2 | 3 | 4 | 5 | 6 | 7 | 8 |
| a | RISK VALUE ~332 | 3,000 | 3,000 | 3,000 | 3,000 | 3,000 | 3,000 | 3,000 | 3,000 |
| b | CREDIT LIMIT ~602A | 5,000 | 5,000 | 5,000 | 5,000 | 5,000 | 5,000 | 5,000 | 5,000 |
| c | INITIAL WAIVED MARGIN ~604a | 25,000 | 25,000 | 25,000 | 25,000 | 25,000 | 25,000 | 25,000 | 25,000 |
| d | MAX TOTAL MARGIN ~606A | 25,000 | 30,000 | 30,000 | 30,000 | 30,000 | 30,000 | 30,000 | 30,000 |
| e | USED MARGIN ~612 | 25,000 | 20,000 | 20,000 | 20,000 | 25,000 | 25,000 | 20,000 | 20,000 |
| f | UNREALISED PROFITS/LOSSES ~608 | (4,000) | (7,000) | 1,000 | (4,000) | (4,000) | (4,000) | (7,000) | (7,000) |
| g | GUARANTEED PROFITS ~610 | 500 | 0 | 500 | 0 | 500 | 500 | 500 | 500 |
| h | AVAILABLE CASH ~600B | 500 | (3,500) | 500 | (11,500) | 2,500 | (2,500) | 1,500 | (4,500) |
| j | AVAILABLE CREDIT ~602B (if(f<0,b-f,b)) | 1,000 | (2,000) | 5,000 | 1,000 | 1,000 | 1,000 | (2,000) | (2,000) |
| k | AVAILABLE WAIVED MARGIN ~604B (c-e) | 0 | 5,000 | 5,000 | 5,000 | 0 | 0 | 5,000 | 5,000 |
| m | AVAILABLE TOTAL MARGIN ~606B (d-e) | 0 | 10,000 | 10,000 | 10,000 | 5,000 | 5,000 | 10,000 | 10,000 |
| | AVAILABLE CREDIT ~602B + AVAILABLE WAIVED MARGIN + AVAILABLE CASH ~600B + GUARANTEED PROFITS ~610 (j+k+h+g) | 2,000 | (500) | 11,000 | (5,500) | 4,000 | (1,000) | 5,000 | (1,000) |
| | AVAILABLE CREDIT ~602B + AVAILABLE CASH ~600B + GUARANTEED PROFITS ~610 (j+h+g) | 2,000 | (5,500) | 6,000 | (10,500) | 4,000 | (1,000) | 0 | (6,000) |
| | AVAILABLE WAIVED MARGIN ~604B + AVAILABLE CASH + GUARANTEED PROFITS ~610 (k+h+g) | 1,000 | 1,500 | 6,000 | (6,500) | 3,000 | (2,000) | 7,000 | 1,000 |

FROM FIG. 5D

| | | | | | | | | |
|---|---|---|---|---|---|---|---|---|
| 1. AVAILABLE TOTAL MARGIN ~606B ≥ RISK VALUE ~332 | N | Y | Y | Y | Y | Y | Y | Y |
| 2. AVAILABLE WAIVED MARGIN ~604B ≥ RISK VALUE ~332 | N | Y | Y | Y | N | Y | Y | Y |
| 3. AVAILABLE CREDIT ~602B ≥ 0  ~604B | Y | N | N | Y | Y | N | N | N |
| 4. AVAILABLE CREDIT ~602B + AVAILABLE WAIVED MARGIN + AVAILABLE CASH ~600B + GUARANTEED PROFITS ~610 ≥ RISK VALUE ~332 | N | N | Y |  | N | Y | Y | N |
| 5. AVAILABLE CREDIT ~602B + AVAILABLE CASH ~600B + GUARANTEED PROFITS ~610 ≥ 0  600B | Y | N | Y | Y | Y | N | N | N |
| 6. AVAILABLE WAIVED MARGIN ~602B + AVAILABLE CASH ~332 + GUARANTEED PROFITS ~610 ≥ RISK VALUE ~332 | N | N | Y | Y | Y | N | N | N |
| CREDIT CHECK 606B 610 | REJECT | REJECT | ACCEPT | REJECT | ACCEPT | REJECT | ACCEPT | REJECT |
| 1. AVAILABLE CASH + GARANTEED PROFITS ≥ 0 | Y | Y | Y | N | Y | N | Y | N |
| 2. AVAILABLE CREDIT ~602B ≥ 0 | Y | N | Y | Y | Y | Y | N | N |
| 3. AVAILABLE CREDIT ~602B + AVAILABLE CASH ~606B + GUARANTEED PROFITS ~610 ≥ 0 | Y | N | Y | N | Y | N | Y | N |
| MARGIN CALL | NO | (8,000) | NO | (11,500) | NO | (2,000) | NO | (8,500) |
| AVAILABLE FOR TRADING | 0 | 0 | 10,000 | 0 | 4,000 | 0 | 7,000 | 0 |

| ACCOUNT ID | USER NAME | USER ID | USER PASSWORD | INITIAL BALANCES | CURRENT BALANCES | TYPE OF ACCOUNT | OPEN ORDERS | TRADES EXECUTED |
|---|---|---|---|---|---|---|---|---|
| LC43253 | JACK TORCH | JTORCH | WINGNUT | ... | ... | LARGE CREDIT | TLJ917 | PVJ225 |
| D59321 | DARRELL KIM | DAK | YELLOWFEVER | ... | ... | DEPOSIT | ACR843 BLX171 MRT419 | NTR682 JPL502 |
| SC38840 | SADAF BROWN | SADFOO | MAMA | ... | ... | SMALL CREDIT | | XXF347 TVV905 |
| ... | ... | ... | ... | ... | ... | ... | ... | ... |
| SL40995 | MICHAEL ITO | MIGUELITO | JMAN | ... | ... | DEPOSIT STOP-LOSS | DLT945 JOR662 TLT323 MYF615 | RLT789 |

*FIG. 6*

| ORDER ID | USER ID | PRODUCT ID | BUY/SELL | QUOTE/PRICE | UNIT STAKE | RISK FACTOR | RISK VALUE | TIME PLACED | PRIORITY |
|---|---|---|---|---|---|---|---|---|---|
| TLJ917 | JTORCH | TLJ | BUY | 27 pts. | $15/pt. | 27 pts. | $405 | 04.03.03.03:11 | D |
| ACR843 | DAK | ACR | SELL | 48 pts. | $5/pt. | 35 pts. | $175 | 13.03.03.08:47 | B |
| BLX171 | DAK | BLX | SELL | 32 min. | $10/min. | 25 min. | $250 | 28.02.03.16:02 | R |
| MRT419 | DAK | MRT | BUY | 72 runs | $3/run | 72 runs | $216 | 26.02.03.20:49 | A |
| ... | ... | ... | ... | ... | ... | ... | ... | ... | ... |
| MYF615 | MIGUELITO | MYF | SELL | 4.2 goals | $50/goal | 3 goals | $150 | 08.03.03.22:31 | F |

SYSTEM AND METHOD FOR MANAGING RISK ASSOCIATED WITH PRODUCT TRANSACTIONS

RELATED APPLICATIONS

This application is related to and claims the benefit of U.S. Provisional Application No. 60/471,744 filed May 15, 2003.

TECHNICAL FIELD OF THE INVENTION

This invention relates in general to product transactions and, more particularly, to a system and method for managing risk associated with product transactions.

BACKGROUND OF THE INVENTION

The Internet and the increasing availability of broadband services has led to the proliferation of online gambling, including online sports betting. In general, to participate in online gambling activities, such as placing bets on sporting events, a user must open an account with an online gambling service, which is typically a deposit or credit account. Once the user's account is open and funded, the user may participate in online gambling activities using the funds or balance available in his or her account. Over time, the user may deposit additional funds into, or withdraw funds from, his or her account.

To establish an account with an online gambling service, a user typically completes an account application, which must be approved by the online gambling service. For a deposit account, the user typically completes an online account application and funds the account through a credit card transaction with the online gambling service or by physically mailing a check, cash, or similar payment to the online gambling service. For a credit account, the user may be required to mail particular items, such as a credit card or bank statement for example, to the online gambling service in order for the gambling service to determine whether to approve the account application. Such mailings introduce delays into the account opening process, which may discourage potential users from opening an account with the gambling service.

SUMMARY OF THE INVENTION

According to one embodiment, a method of managing trading orders is provided. The method includes receiving a request to place a first order to trade a first product, the request being made using an account having one or more current balances. The method further includes determining a risk value for the first order based at least in part on the first product. The method further includes determining whether to approve the first order based at least in part on the risk value determined for the first order and one or more of the current balances for the account, and if the first order is approved, placing the first order.

According to another embodiment, a system for managing orders is provided. The system includes a memory and a processor. The memory is operable to store an account. The processor is operable to receive a request to place a first order to trade a first product, the request being made using the account. The account has one or more current balances. The processor is further operable to determine a risk value for the first order based at least in part on the first product. The processor is operable to determine whether to approve the first order based at least in part on the risk value determined for the first order and one or more of the current balances for the account, and if the first order is approved, to place the first order.

Various embodiments of the present invention may benefit from numerous advantages. It should be noted that one or more embodiments may benefit from some, none, or all of the advantages discussed below.

One advantage of the invention is that a trading platform may be operable to activate a new account for a prospective user in real time or substantially in real time. For example, if a prospective user requests a new account during an Internet session between a client used by the prospective user and the trading platform, the trading platform may approve the account for the prospective user and open the account such that the user may access the account and/or begin trading activity during the same Internet session with the trading platform. In some embodiments, the trading platform is operable to activate a credit account (or at least an account having a credit component) for a prospective user in real time or substantially in real time, such as during an Internet session as described above. Thus, a prospective user may access a web site associated with the trading platform, apply for a credit account, have the account approved quickly, login using the opened credit account, and begin trading activity on the trading platform, all in one communication session (such as an Internet session, for example) with the trading platform.

Another advantage of the invention is that a trading platform may be operable to determine whether to approve each of a variety of types of accounts, and to activate at least one approved type of account, for a prospective user in real time or substantially in real time. For example, if a prospective user requests a new account during an Internet session between a client used by the prospective user and the trading platform, the trading platform may determine whether to approve each of a variety of types of accounts for the prospective user, receive a selection from the user, of one of the approved types of accounts and open the selected type of account for the user such that the user may access the account and/or begin trading activity during the same Internet session with the trading platform. Such types of accounts may include, for example, a deposit account, a credit account, a hybrid deposit/credit account, and a stop-loss account.

The trading platform may determine whether to approve each type of account based on credit information regarding the user (such as a credit score, an identity score and/or other credit information for example) received from one or more credit verification entities, such as credit bureaus. The trading platform may apply a decision matrix and/or other business rules to the credit information to determine whether to approve each type of account for the user.

In some embodiments, by determining whether to approve each of a variety of types of accounts for prospective users, the trading platform may determine an appropriate credit limit or other initial account balances (and/or other account parameters) to grant each user based on the perceived credit risk of that user (according to received credit information regarding the user), which may reduce the amount of uncollected debts owed by users to trading platform.

Yet another advantage is that a trading platform may be operable to determine a risk value for an order to trade a particular betting product, which may be an estimate of the likely maximum loss that the user making the order could experience if the order is matched (in other words, if the bet is executed). The risk value may be based at least on the size, or unit stake, of the order and a risk factor determined for the particular betting product. The risk factor may be based at least on historical data regarding the type of the particular betting product.

The risk value for an order, which represents an estimated maximum loss that the user could experience, may be different than the actual maximum loss that the user could experience. For example, the actual maximum amount that a user could lose on an order to trade a betting product may be $950, whereas the risk value for that order may be $700. The trading platform may determine whether to allow a user to place particular orders based on the risk values determined for such orders and one or more current balances in the user's account. Since the risk value for an order may be less than the actual maximum amount that the user could lose on the order, the trading platform may allow a user to place orders that would not be allowed by previous betting moderators, resulting in increased liquidity and thus increased profits for the trading platform.

Still another advantage is that the risk value of a user's executed order may be updated during the event or events underlying the order. As a result, one or more current balances in the user's account may be updated accordingly. In addition, the size of other unexecuted orders placed by the user may be adjusted based on the updated risk value of the executed order. Such updates may result in additional increased liquidity and thus increased profits for the trading platform.

Still another advantage is that a trading platform may act as an intermediary for effecting transactions between various users of the trading platform. For example, the trading platform may create obligations and execute a separate transaction with each user involved in a trade, thus giving each user the appearance of transacting directly with the other user. In this manner, the trading platform may be said to effectuate a "virtual" transaction between the users involved in each trade. By creating obligations and executing a separate transaction with each user involved in a trade, rather than facilitating a direct trade between the users, the trading platform may be able to manage the obligations created for each user independently. For example, if a first user in a trade fails to make a payment regarding the trade, the trading exchange may make the payment to the second user, essentially on behalf of the first user, and separately attempt to collect the payment from the first user. In this manner, a user who is owed a payout due to a successful trade may be assured of receiving the payout. In other embodiments, the trading platform may facilitate direct trades between users.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 1A and 1B illustrate one embodiment of a system for providing accounts to users for participation in a trading platform;

FIGS. 4A and 4B illustrate an example embodiment of a set of rules for use in conjunction with the approval decision matrix of FIG. 3 to make account approval determinations;

FIGS. 5A though 5E illustrate an example methodology, as well as the application of the methodology for a variety of scenarios, for determining whether to approve a requested trading order in accordance with one embodiment of the present invention;

FIG. 6 illustrates an embodiment of an account database comprising any number of accounts used in the trading platform of FIGS. 1A and 1B;

FIG. 7 illustrates an embodiment of an open order database comprising any number of open trading orders placed on the trading platform of FIGS. 1A and 1B;

DETAILED DESCRIPTION OF EXAMPLE EMBODIMENTS OF THE INVENTION

Figure 1B:
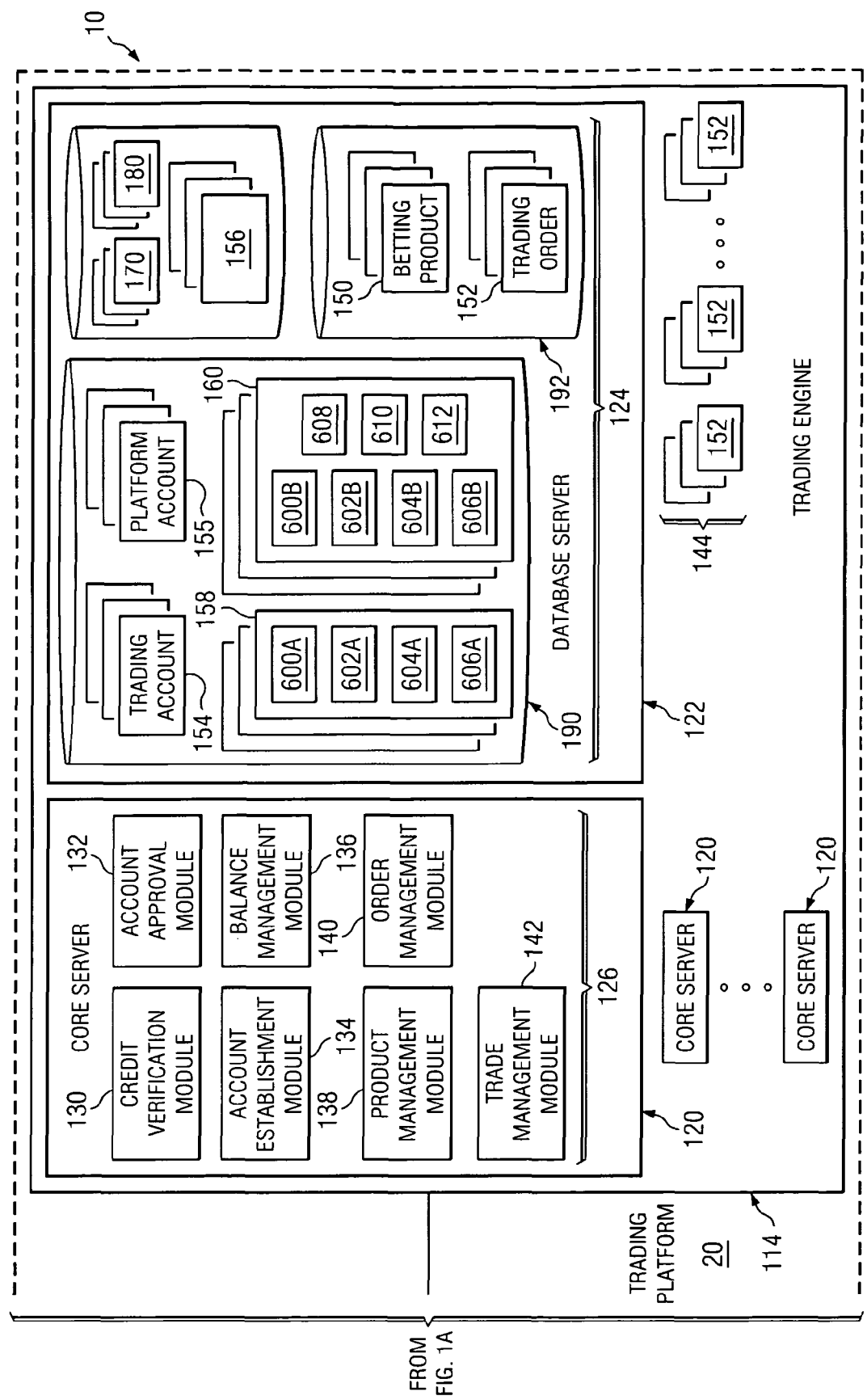

FIGS. 1A and 1B illustrate one embodiment of a system 10 that facilitates establishing accounts used for performing any suitable financial transaction. System 10 includes a communications network 100, one or more clients 104, one or more credit verification entities 106, and a trading platform 20. Trading platform 20 includes one or more servers 108, one or more operator terminals 110, a communications network 112 and a trading engine 114. Other architectures and components of system 10, including various architectures and components of trading platform 20, may be used without departing from the scope of this disclosure.

In general, trading platform 20 provides users of clients 104 with trading accounts 154 that may be used for trading betting products 150, for example, with other users of clients 104. Trading engine 114 provides services such as, for example, approving and opening user accounts, managing available funds or account balances for users, establishing risk factors for betting products 150, placing trading orders 152, and matching trading orders 152 to execute trades. Trading engine 114 may perform other functions or provide other services without departing from the scope of this disclosure.

It should be understood that although the following discussion of trading platform 20 focuses on trading accounts 154 and trading betting products 150, in alternative embodiments, trading platform 20 may be used for trading any suitable type of product, such as financial products, contract, or merchandise, for example. In such embodiments, betting products 150 may be supplemented with or replaced by any suitable type of product or products. Similarly, trading platform 20 may be used to open any suitable type of account 154. Moreover, trading platform 20 may be any other entity suitable to provide accounts to various users, such as a financial institution or an online merchant, for example. Trading platform 20 may also be referred to as account provider 20.

Communications network 100 couples and facilitates wireless or wireline communication between clients 104, credit verification entities 106 and servers 108. Communications network 100 may, for example, communicate Internet Protocol (IP) packets, Frame Relay frames, Asynchronous Transfer Mode (ATM) cells, voice, video, data, and other suitable information between network addresses. Communications network 100 may also communicate data via wireless communications, such as by Wireless Application Protocol (WAP) standard protocols, including 802.11, third-generation (3G) protocols (such as W-CDMA or CDMA 2000, for example), or Global System for Mobile Communications (GSM) protocols, for example. Communications network 100 may include one or more local area networks (LANs), radio access networks (RANs), metropolitan area networks (MANs), wide area networks (WANs), interactive television networks, all or a portion of the global computer network known as the Internet, and/or any other communication system or systems at one or more locations.

Clients 104 may comprise computer systems that include appropriate input devices, output devices, mass storage media, processors, memory, or other components for receiving, processing, storing, and/or communicating information with other components of system 10. As used in this document, the term "computer" is intended to encompass a personal computer, workstation, network computer, wireless data port, wireless telephone, personal digital assistant (PDA), cellular telephone, one or more processors within these or other devices, or any other suitable processing device. It will be understood that any number of clients 104 may be coupled to communications network 100. Clients 104 are generally operated by users to trade products, such as betting products 150, for example, using trading platform 20.

As shown in FIG. 1A, a particular client 104 may comprise a browser application 116, such as an Internet web browser, for example. Browser application 116 may allow a user of client 104 to navigate through, or "browse," various Internet web sites or web pages. Client 104 may also comprise one or more graphics applications 118, such as a FLASH™ application for example, operable to display various types of data received via communications network 100, such as graphics, video, and streaming data (such as video and/or audio), for example.

Credit verification entities 106 are generally operable to collect, organize and analyze credit and identification information regarding consumers, and to provide such information and/or various evaluations of such information, such as credit scores and/or identification authentication scores, to trading platform 20. Credit and identification information may include credit history information, payment information, personal information regarding occupation, income, home ownership, etc., and any other suitable information. As an example only and not by way of limitation, credit verification entities 106 may include credit bureaus, such as EXPERIAN, TRANS UNION, EQUIFAX, or any other entities suitable to collect, organize and/or analyze credit information regarding prospective or current users of system 10.

As discussed above, trading platform 20 includes servers 108, operator terminals 110, communications network 112 and trading engine 114. Communications network 112 couples and facilitates wireless or wireline communication between servers 108, operator terminals 110 and trading engine 114. Communications network 112 may, for example, communicate Internet Protocol (IP) packets, Frame Relay frames, Asynchronous Transfer Mode (ATM) cells, voice, video, data, and other suitable information between network addresses. Communications network 112 may also communicate data via wireless communications, such as by Wireless Application Protocol (WAP) standard protocols, including as 802.11, third-generation (3G) protocols (such as W-CDMA or CDMA 2000, for example), or Global System for Mobile Communications (GSM) protocols, for example. Communications network 112 may include one or more local area networks (LANs), radio access networks (RANs), metropolitan area networks (MANs), wide area networks (WANs), interactive television networks, all or a portion of the global computer network known as the Internet, and/or any other communication system or systems at one or more locations. In various embodiments, communications networks 100 and 112 may be partially or totally separate networks, partially overlapping networks, or the same networks. In a particular embodiment, communications network 100 is a public network, such as the Internet, while communications network 112 is a private or restricted-access network.

In the example embodiment shown in FIGS. 1A and 1B, trading engine 114 comprises one or more core servers 120 and a database server 122. Database server 122 includes one or more databases 124 operable to store various data 156 associated with trading platform 20, such as information regarding users, clients 104, operators, operator terminals 110, and betting products 150, for example. Databases 124 may also comprise one or more approval decision matrices 170 and sets of other business rules 180, as discussed in greater detail below. In addition, one or more databases 124 may comprise an account database 190 including data regarding various trading accounts 154 (for example, see FIG. 6), such as data regarding various initial balances 158 and current balances 160 for each of a number of trading accounts 154, for example. Further, one or more databases 124 may comprise an open order database 192 including information regarding betting products 150 and/or various trading orders 152 (for example, see FIG. 7). Database server 122 may communicate with core servers 120 such that core servers 120 may store information, retrieve information, and share information with each other. Database server 122 may provide a backup in the case of outages or other failures of various components of trading platform 20.

Each core server 120 includes one or more function modules 126 that may provide particular functionality associated with system 10. Trading engine 114 may include any number of core servers 120, each of which may provide some or all of the functionality of one or more other core servers 120. In this manner, core servers 120 may share the processing load as well as provide partial or complete redundancy for performing the various functionalities associated with function modules 126, which may be useful in the case of outages or other failures of particular core servers 120 or components thereof.

As an example only and not by way of limitation, a function module 126 may provide functionality associated with verifying the identity and/or credit of prospective users; determining whether to approve one or more types of trading accounts 154 for prospective users; opening and/or activating trading accounts 154; managing available funds or balances in various trading accounts 154; managing betting products 150; and managing trading orders 152 to trade betting products 150, for example. A function module 126 may be called by another component of trading platform 20, such as a server 108 or operator terminal 110, for example, and in response, provide the particular functionality associated with that function module 126. Each function module 126 comprises any suitable combination of hardware and software in trading engine 114 to provide the described function or operation of that function module 126. For example, function modules 126 may include program instructions, as well as the associated memory and processing components to execute the program instructions.

The representation of the various function modules 126 shown in FIGS. 1A and 1B may be a logical, rather than physical, representation of the various functionalities provided by trading engine 114. Thus, various function modules 126 may be separate or at least partially combined or integral to other function modules 126. Thus, in some embodiments, one or more function modules 126 may be physically distributed such that each function module 126, or multiple instances of each function module 126, may be located in a different physical location geographically remote from each other. In other embodiments, one or more function modules 126 may be combined and/or integral to each other. For example, a particular set of computer code may include any number of interrelated or integral function modules 126.

As discussed above, function modules 126 are generally operable to perform various functions in the operation of trading platform 20. In the embodiment shown in FIG. 1, function modules 126 include a credit and identity verification module 130, an account approval module 132, an account establishment module 134, a balance management module 136, a product management module 138, an order management module 140, and a trade management module 142. Credit and identity verification module 130, account approval module 132, and account establishment module 134 are generally operable to perform account opening functions, including obtaining information regarding potential users, determining whether to approve trading accounts 154 for such users, and opening approved trading accounts 154. Balance management module 136 is generally operable to manage one or more various balances available for trading activity for each of a number of trading accounts 154 associated with trading platform 20. Product management module 138 and order management module 140 are generally operable to perform risk management functions, including determining risk factors 330 and risk values 332 for various betting products 150 and trading orders 152, respectively, and determining whether to allow users to place particular trading orders 152 based at least on the risk values 332 of such trading orders 152. Trade management module 142 is generally operable to match trading orders 152 in order to execute trades.

Trading engine 114 further comprises a memory that may be accessed or otherwise utilized by one or more components of trading engine 114. The memory may take the form of volatile or non-volatile memory including, without limitation, magnetic media, optical media, random access memory (RAM), read-only memory (ROM), removable media, or any other suitable local or remote memory component. Such memory may be separate from or integral to other memory devices in trading platform 20. In general, the memory may store various account information, trading information, and product information in any suitable format including, for example, XML tables, flat files, comma-separated-value (CSV) files, SQL tables, relational database tables, objects, and others.

Servers 108 are generally operable to provide an interface between clients 104 and trading platform 20. One or more servers 108 may be web application servers or processors operable to allow users of clients 104 to participate in trading platform 20 via the Internet using a standard user interface language such as, for example, the HyperText Markup Language (HTML). One or more servers 108 may be separate from or integral with trading engine 114. In addition, in some embodiments, one or more servers 108 may be physically distributed such that each server 108, or multiple instances of each server 108, may be located in a different physical location geographically remote from each other and/or from trading engine 114. In other embodiments, one or more servers 108 may be combined and/or integral to each other. One or more servers 108 may be implemented using a general purpose personal computer (PC), a Macintosh, a workstation, a UNIX-based computer, a server computer, or any other suitable processing device.

In some embodiments, servers 108 are operable to provide security and/or authentication of users or other persons or entities attempting to access trading platform 20. For example, servers 108 may essentially provide a firewall for entities attempting to access trading platform 20. In addition, servers 108 may be operable to translate one or more data protocols used by trading engine 114 with one or more protocols used by applications hosted by one or more clients 104. In particular embodiments, servers 108 may be operable to translate a particular data protocol used by trading engine 114 with a particular protocol that can be understood by graphics application 118 (such as a FLASH™ application, for example) hosted by one or more clients 104.

In particular embodiments, one or more servers 108 are web application servers operable to communicate dynamically updated information to particular clients 104 via communications network 100. For example, one or more servers 108 may communicate dynamically updated information regarding activities occurring on trading platform 20 to particular clients 104 via communications network 100. In some embodiments, one or more servers 108 communicate notifications and/or other suitable information when trading orders 152 are placed and/or matched (in other words, when trades are executed) in real time or substantially in real time to particular clients 104 identified as interested in such trading orders 152. Servers 108 communicate such notifications and/or other suitable information to clients 104 via e-mail or by one or more dynamically updated web pages, for example.

In particular embodiments, when a new trading order 152 is placed on trading platform 20, trading engine 114 stores the trading order 152 in one or more databases, which may include databases 124, and broadcasts an update regarding the new trading order 152 to particular interested entities. Such interested entities may include one or more operator terminals 110 that need to know about the new trading order 152 for the proper operation of trading platform 20, as well as one or more servers 108 which may communicate the update to one or more clients 104 identified as being interested in that update. For example, one or more servers 108 may broadcast to one or more particular clients 104 an updated web page which notifies such clients 104 of the new trading order 152 or executed trade.

Operator terminals 110 are generally operable to provide operators of trading platform 20 access to trading engine 114 via communications network 112. Operators of trading platform 20 may include system administrators, trading brokers for users of trading platform 20 (which may include telephone brokers, for example), traders operable to trade betting products 150 on trading platform 20 on behalf of trading platform 20 itself and/or any other entity suitable to have access to all or particular aspects of the internal operations of trading platform 20.

Operator terminals 110 may comprise computer systems that include appropriate input devices, output devices, mass storage media, processors, memory, or other components for receiving, processing, storing and/or communicating information with other components of system 10. It will be understood that there may be any number of operator terminals 110 coupled to communications network 112.

One or more operator terminals 110 may comprise a graphical user interface (GUI) application 146 which may be used to communicate information to clients 104 and/or users of clients 104 via communication network 100. For example, if a user or client 104 makes a request for particular information from an operator, the operator may use GUI application 146 to communicate the requested information to trading engine 114, which may forward the information to the requesting user or client 104 via communications network 100.

In operation, during a communication session between a client 104 and trading platform 20, trading platform 20 allows a user of client 104 to apply online for one or more types of trading accounts 154, determines whether to approve or deny each of the one or more types of trading accounts 154 (or refers the user to an operator of trading platform 20 for further instructions), and opens at least one of the approved trading accounts 154 for the user. Trading platform 20 grants the user access to the newly opened trading account 154 during the same communication session between client 104 and trading platform 20 in which the application for the trading account 154 was made. Such a communication session is indicated by bi-directional path 148 shown in FIG. 1A.

Communication session 148 comprises any suitable communication session between a client 104 and trading platform 20 via communications network 100. For example only and not by way of limitation, communication session 148 may comprise communications using web applications, e-mail, file transfer protocol (FTP), wireless application protocol (WAP), telephone, facsimile, or any other suitable means of communicating data between a client 104 and trading platform 20. Thus, communication session 148 may include a web-based session in which a user uses browser 116 hosted by a client 104 to navigate through various web sites or web pages associated with trading platform 20. Communication session 148 may include one or more relatively brief interruptions, such as to start or restart an application or an instance of an application (such as browser application 116 or graphics application 118, for example), or in the case of a web-based communication session 148, to temporarily visit one or more web sites or web pages not related to trading platform 20, for example.

Thus, a prospective user of trading platform 20 may apply for a trading account 154, which may comprise a credit account or an account including a credit component, have the trading account 154 approved and opened, and begin various trading activities using the new trading account 154, all during a single communication session 148 and/or in a relatively short period of time. Thus, the prospective user need not mail any information (such as identification information or credit information, for example) to trading platform 20 when applying for a trading account 154, which is commonly required by traditional account providers. As a result, prospective users do not have to experience the significant delays associated with opening accounts with traditional account providers, such as delays associated with mailing information to or from the account provider.

As mentioned above, after a user's trading account 154 has been approved and opened, the user may begin a variety of trading activities. For example, the user may make requests to place trading orders 152 to trade various betting products 150. As discussed below in greater detail, trading platform 20 may determine a risk value 332 for each trading order 152, which may be an estimate of the likely maximum loss that the user making the order could experience if that trading order 152 is matched (in other words, if the trade is executed). Trading platform 20 may determine whether to allow the user to place trading orders 152 based on the risk values 332 determined for such trading orders 152 and one or more current balances in the user's trading account 154. In some cases, the risk values 332 determined for particular trading orders 152 are lower than the maximum possible loss that the user could lose if such trading orders 152 were executed. As a result, as described below in greater detail, the use of such risk values 332 may allow the user to place more trading orders 152 than would otherwise be allowed, resulting in increased liquidity and thus increased profits for trading platform 20.

As discussed above, various functions of trading platform 20, such as those mentioned above, may be performed by or using one or more of the function modules 130 through 142 shown in FIG. 1B. For example, account opening functions may generally be performed by credit and identity verification module 130, account approval module 132, and account establishment module 134. Balance and/or funds management functions may generally be performed by balance management module 136. Risk management functions, such as determining risk factors 330 and risk values 332 for betting products 150 and trading orders 152, and determining whether to whether to allow users to place particular trading orders 152, may generally be performed by product management module 138 and order management module 140. Finally, the execution of trades may generally be performed by trade management module 142.

Opening Accounts

Credit and identity verification module 130 is generally operable to communicate with one or more credit verification entities 106 in order to obtain information regarding particular users, such as credit information 308 regarding such users, that may be used by account approval module 132 in determining whether to approve various types of trading accounts 154 for such users, as described in greater detail below with reference to FIG. 2. In some embodiments, credit and identity verification module 130 is generally operable to receive identification information regarding a particular user and communicate a request to one or more credit verification entities 106 for credit information regarding the particular user based on the user's identification information. For example, a prospective user attempting to open an online trading account 154 with trading platform 20 may enter various identification information (such as the prospective user's name, address, social security number, employment information, and financial information, for example) into one or more web pages associated with trading platform 20. Credit and identity verification module 130 communicates a request for credit information from one or more credit verification entities 106. The request may include at least a portion of the identification information received from the prospective user, as well as the type or types of requested credit information. One or more of the credit verification entities 106 may then identify, or attempt to identify, the prospective user based on the identification information included in the request, retrieve credit information regarding the prospective user, and communicate the retrieved credit information to trading platform 20. Credit and identity verification module 130 receives the credit information from the one or more credit verification entities 106.

Account approval module 132 is generally operable to determine whether to approve, deny, or otherwise manage requests from prospective users to open trading accounts 154 with trading platform 20. Account approval module 132 may make such determinations based at least in part on credit information received by credit and identity verification module 130 from credit verification entities 106. For example, as discussed below in greater detail with regard to FIGS. 2 and 3, a particular credit verification entity 106 may provide credit and identity verification module 130 with an identity score, a credit score and/or one or more credit information details regarding a prospective user who is applying for a trading account 154 with trading platform 20. Account approval module 132 may then determine whether to approve, deny, or otherwise handle the application for the trading account 154 based at least in part on this received credit information regarding the prospective user.

In some embodiments in which trading platform 20 provides more than one type of trading account 154, such as a deposit account, a credit account, a stop-loss account and/or a hybrid account, for example, account approval module 132 makes approval determinations for each type of trading account 154 for a prospective user based at least in part on this received credit information regarding the prospective user. For example, based on received credit information 308 regarding the prospective user, account approval module 132 may approve for the prospective user a deposit account and a hybrid deposit/credit account, but deny the prospective user a pure credit account. In particular embodiments, as discussed in greater detail with respect to FIG. 3, account approval module 132 may apply an approval decision matrix 170 to credit information 308 received from a credit verification entity 106 regarding a prospective user in order to make account approval determinations for the prospective user.

In such embodiments in which trading platform 20 provides more than one type of trading account 154, account approval module 132 may communicate to a prospective user (such as via e-mail or an appropriate web page, for example) the particular types of trading accounts 154 for which the prospective user is approved and/or denied. Account approval module 132 receives a selection from the prospective user of one or more approved types of trading accounts 154 that the prospective user would like to open. For example, account approval module may communicate a web page to a prospective user identifying the types of trading accounts 154 for which the prospective user is approved, and the prospective user may then select, using browser application 116, one of the approved trading accounts 154 to be opened.

Account establishment module 134 is generally operable to perform the functions necessary to establish, or open, trading accounts 154 for prospective users of trading platform 20. For example, for an approved trading account 154 that the prospective user wishes to have opened, account establishment module 134 may create the trading account 154, including creating a set of account identification data 322 for the trading account 154, which may include, for example, a user ID 324, a user password 326, and an account number for the new account, as discussed below with reference to FIG. 2. Account establishment module 134 communicates such account identification data 322 to the prospective user via communications network 100 (such as via e-mail, for example), as discussed below with reference to FIG. 2.

In particular embodiments, account establishment module 134 activates the new trading account 154 in real time or substantially in real time. For example, if a prospective user requests a new trading account 154 during a communication session between a client 104 and trading platform 20 (such as communication session 148, for example), account approval module 132 may approve the trading account 154 for the prospective user and account establishment module 134 may activate the trading account 154 such that the user may access the trading account 154 and/or begin trading activity during the same communication session in which the request for the trading account 154 was made.

Managing Available Balances

Balance management module 136 is generally operable to manage one or more balances associated with each trading account 154 provided by trading platform 20. Managing such balances may include determining initial balances and/or limits 158 and managing current balances 160 over time.

Initial balances and/or limits 158 may include, for example, an initial cash balance 600A, a credit limit 602A, an initial waived margin balance 604A, and a maximum total margin balance 606A. Current balances 160 may include, for example, a current cash balance 600B, an available credit balance 602B, an available waived margin balance 604B, an available total margin balance 606B, an unrealized profits/losses balance 608, a guaranteed profits balance 610, and a used margin balance 612.

The available waived margin balance 604B and the available total margin balance 606B for a user's trading account 154 are generally available to the user for placing trading orders 152 which the user may not otherwise have been able to place based on the user's current cash balance 600B and available credit balance 602B, as discussed in greater detail below with reference to FIGS. 5A-5E. The available waived margin balance 604B and the available total margin balance 606B for a particular trading account 154 may partially or even completely overlap.

One or more initial balances and/or limits 158 associated with a new trading account 154 may be determined by balance management module 136 based at least on the type or types of the new trading account 154. For example, a particular user may be approved for (1) a "small credit account" providing a $500 credit limit 602A and a $1,250 initial waived margin balance 604A, and (2) a "hybrid credit/deposit account" providing a $500 credit limit 602A and a $1,250 initial waived margin balance 604A, plus an initial cash balance 600A including any deposited amounts, while being denied (3) a "large credit account" providing a $1,000 credit limit 602A and a $2,500 initial waived margin balance 604A.

Since the type or types of trading accounts 154 approved for a particular user may be based on credit information 308 regarding the user (as discussed above), one or more initial balances and/or limits 158 for the user's trading account 154 may be determined based at least in part on particular credit information 308 regarding the user. In addition, one or more initial balances and/or limits 158 associated with a trading account 154 may otherwise be determined based at least in part on particular credit information 308 regarding the relevant user. For example, in some embodiments, one or more initial balances and/or limits 158 associated with a trading account 154 may not be specifically defined by the type of the trading account 154. In such embodiments, balance management module 136 may determine any initial balances and/or limits 158 associated with a new trading account 154.

In some embodiments, the initial waived margin balance 604A for a trading account 154 (at least initially) is proportional to the credit limit 602A determined for the trading account 154. For example, in one embodiment, the initial waived margin balance 604A for each trading account 154 is equal to 2.5 times the credit limit 602A determined for that trading account 154. To illustrate, in such an embodiment, a user provided with a $500 credit limit 602A would be provided with a $1,250 (in other words, 2.5*$500) initial waived margin balance 604A.

Balance management module 136 may determine a maximum total margin balance 606A for a new trading account 154 based at least in part on particular credit information 308 regarding the user. In one embodiment, the maximum total margin balance 606A for a new trading account 154 may be determined independently of the initial cash balance 600A, the credit limit 602A and the initial waived margin balance 604A for the new trading account 154. For example, suppose balance management module 136 approves a large credit account for each of two users, each large credit account providing the respective user a credit limit 602A of $1,000 and an initial waived margin balance 604A of $2,500. Balance management module 136 may provide one of the two users a higher maximum total margin balance 606A than the other based at least in part on credit information 308 regarding the users.

In this manner, trading platform 20 may determine the amount of various initial balances and/or limits 158 based on the perceived credit risk of that user (according to various credit information 308 regarding the user), which may reduce the amount of uncollected debts owed by users to trading platform 20.

In addition, balance management module 136 may manage, such as by updating or adjusting, one or more current balances 160 for trading accounts 154 over time based at least on the initial balances and/or limits 158 for such trading accounts 154, any trading activity performed using the trading account 154 and/or any deposits or withdrawals to or from the trading account 154.

For example, if a trade is executed for a user—in other words, if the user places a trading order 152 and the trading order 152 is matched by another trading order 152—balance management module 136 may increase the used margin balance 612 by an amount equal to (or at least based on) the risk value 332 for the trading order 152, thus reducing the available waived margin balance 604B and the available total margin balance 606B for the trading order 152 (based on equations 3 and 4 shown in FIG. 5A, for example), as discussed below with reference to product management module 138.

Risk Management

In order to understand various aspects of the risk management functions provided by trading platform 20, it is helpful to understand some basic concepts and terminology regarding betting products 150 and trading order 152. An example betting product 150, as well as example trading orders 152 to buy and to sell such betting product 150, are provided below in the context of a spread betting system.

Suppose a betting product 150 which comprises a spread bet regarding the number of runs England will score in their first innings in the First Test between England and India in cricket. Further suppose that the quote is 220-240 runs, which indicates that England is expected to score between 220 and 240 runs. A user who believes that England will score, say, 400 runs may make a request to place a trading order 152 to buy the betting product 150 at the higher quote, or "price," of 240 runs. The user (who may be referred to as the "buyer") will specify a unit stake for the trading order 152, which in this case represents the amount per run that the user wishes to bet.

Suppose, for example, the buyer requests a trading order 152 to buy the betting product 150 for £5/run at the quote of 240 runs, and the trading order 152 is placed and matched (i.e., the trade is executed). The unit stake of the trading order 152 is £5/run and the quote, or "price," is 240 runs. For every run above 240 that England scores, the buyer wins £5. However, for every run below 240 that England scores, the buyer loses £5. Thus, if England scores 300 runs, the buyer wins (300 runs-240 runs)*(£5/run), which equals £300. However, if England scores just 170 runs, the buyer loses (240 runs-170 runs)*(£5/run), which equals £350.

On the other hand, a user (who may be referred to as the "seller") who believes that England will score, say, 150 runs may make a request to place a trading order 152 to sell the betting product 150 at the lower quote, or price, of 220. The seller will specify a unit stake for the trading order 152, which again represents the amount per run that the user wishes to bet.

Suppose, for example, the seller requests a trading order 152 to sell the betting product 150 for £3/run at the quote of 220 runs, and the trading order 152 is placed and matched (i.e., the trade is executed). The unit stake of the trading order 152 is £3/run and the quote, or "price," is 220 runs. For every run below 220 that England scores, the seller wins £3. However, for every run above 220 that England scores, the seller loses £3. Thus, if England scores 150 runs, the seller wins (220 runs-150 runs)*(£3/run), which equals £210. However, if England scores 400 runs, the seller loses (400 runs-220 runs)*(£3/run), which equals £540.

It should be understood that although the example betting product 150 and trading orders 152 discussed above relate to a spread betting system, some or all of the concepts discussed herein may similarly apply to any other types of betting products 150 and trading orders 152, and in the context of any other type of betting system, without departing from the scope of this disclosure.

Generally, each trading order 152 that a user requests to be placed on trading platform 20 is based on at least one betting product 150, such as described above regarding the example betting product 150 and trading orders 152 to buy and sell the betting product 150. Each betting product 150 has a risk factor 330 (see FIG. 2) which generally represents the actual or estimated maximum number of "ticks" for which the user may be liable on a particular betting product 150. A "tick" may represent the type of scoring unit upon which a betting product 150 is based, such as, for example, a run (such as in cricket or baseball, for example), goal (such as in soccer or hockey, for example), point (such as in American football, basketball, or rugby, for example), minute (such as for a betting product 150 regarding the time of the first goal in a soccer match, for example), shirt number (such as for a betting product 150 regarding the total of the shirts numbers of the goal scorers in a soccer match, for example), or stroke (such as a golf stroke, for example). It should be understood that a tick may represent any number or fraction of such scoring units. For example, in a betting product 150 regarding the score of an American football match, each tick may represent one point, and in a betting products 150 regarding the score of a soccer match, each tick may represent 0.1 goals. In the examples used throughout the remainder of this disclosure, it is assumed that each tick represents one scoring unit.

In some embodiments, the value of the risk factor 330 of a betting product 150 represents the actual or estimated maximum amount that the buyer or seller of the betting product 150 could lose by wagering one unit of currency (such as $1/point or £1/goal, for example) on the betting product 150. For example, suppose in the example discussed above it is determined that the risk factor 330 for buying or selling the example betting product 150 is equal to 200 runs. The actual or estimated maximum amount that a buyer or seller of the betting product 150 could lose on a stake of £1/run would thus be £200.

In addition, each trading order 152 has a risk value 332 (see FIG. 2) that generally represents the total actual or an estimated maximum amount that a user could lose on the trading order 152, based at least on the unit stake of the trading order 152 and the risk factor 330 of the underlying betting product 150. As discussed above, the unit stake of a trading order 152 refers to the size of the trading order 152, such as measured in units, shares, pounds, dollars, or any other type of currency, for example. Risk factors 330 and risk values 332 may be determined by product management module 138 and order management module 140, respectively, as discussed in greater detail below.

In a particular embodiment, the risk value 332 for a trading order 152 is determined by multiplying the risk factor 330 for the betting product 150 underlying the trading order 152 by the size, or unit stake, of the trading order 152. Thus, in the example discussed above, the risk value 332 for the buyer's trading order 152 (risk factor=200 runs, unit stake=£5/run) would be (200 runs)*(£5/run), which equals £1000. The risk value 332 for the seller's trading order 152 (risk factor=280 runs, unit stake=£3/run) would be (200 runs)*(£3/run), which equals £600.

Trading platform 20 determines whether to place each requested trading order 152 for a particular user (in other words, whether to approve the user's request to place each trading order 152) based at least in part on one or more equations or algorithms involving the risk value 332 of that trading order 152 and one or more current balances 160 (or combinations thereof) of the user's trading account 154, as discussed in greater detail below with reference to order management module 140 and FIGS. 5A-5E. Such equations or algorithms may include one or more comparisons between the risk value 332 of the trading order 152 and one or more current balances 160 of the trading account 154.

As discussed above, one or more current balances 160 associated with a trading account 154 may be based at least in part on one or more initial balances and/or limits 158 for that trading account 154, which may be based at least in part on credit information 308 received from one or more credit verification entities 106 regarding the user. Thus, in some embodiments, there is a relationship between the credit information 308 regarding a particular user, the risk value 332 determined for a trading order 152 requested by that user, and whether or not that trading order 152 will be placed on trading platform 20.

In addition, relationships may exist between the risk values 332 determined for trading orders 152 placed for a particular user and the management over time of one or more current balances 160 associated with the user's trading account 154. For example, as discussed above, if a user's trading order 152 is matched, or executed, the used margin balance 612 may be increased, and thus the available waived margin balance 604B and available total margin balance 606B reduced, by an amount equal to (or at least based on) the risk value 332 associated with the trading order 152.

Balance management module 136 may reduce and/or increase one or more current balances 160 associated with the user's trading account 154 in a particular order. For example, in one embodiment, when a user's trading order 152 is executed, the user's available waived margin balance 604B and available total margin balance 606B are reduced by an amount equal to the risk value 332 of the trading order 152. If the user loses a particular loss amount on the executed trading order 152, the loss amount may be subtracted from the user's available cash balance 600B and the amount of the risk value 332 of the trading order 152 may be added back to the available waived margin balance 604B and available total margin balance 606B. If the user's available cash balance 600B is zero, the loss amount may be instead subtracted from the user's available credit balance 602B. However, it should be understood that in other embodiments, balance management module 136 may reduce and/or increase current balances 160 in any suitable order or according to any predefined method or approach.

Product management module 138 is generally operable to create and/or manage various betting products 150 that may be traded by users of trading platform 20. As discussed above, a betting product 150 may represent a type of bet, such as a sports bet, for example. For example, a betting product 150 may include a bet regarding the winner of a football match or horse race, a bet regarding the winner of a series of matches such as a series of cricket test matches, a bet regarding the final standings of a football team for a season, a bet regarding the total shirt number of the scorers in an English football match, or a bet regarding the number of runs by one team during the first innings of a cricket match. In some embodiments, types of betting products 150 include, for example, (1) cumulative market, or total number, betting products (such as a bet on the corner kicks in a football match, or a bet on batsmen runs in a cricket innings or match, for example), (2) indices betting products (such as a league championship index in which 1st place gets 6 points, 2nd place gets 4 points, 3rd place gets 3 points, and 4th place gets 1 point, for example), (3) match bets, or supremacy betting products (such as a bet on the final score differential in a football match, for example) and/or (4) time market betting products (such as a bet on the minute of the first goal in a soccer match, for example).

Several terms should be introduced at this point. First, the term "make-up" refers to the final result of an event (such as a game or match) or group of events. The terms "maximum make-up" and "minimum make-up" refer respectively to the largest and smallest possible result, or make-up, of the event or group of events. The term "so-far" refers to the total result at a particular point in time (such as the score of a football match at a point during the match, for example). The term "maximum possible loss" or "maximum potential loss" refers to the maximum amount that may be lost on a bet, such as the maximum amount that may be lost per share or unit of currency (such as $1 or £1, for example) wagered on a particular betting product 150 or the maximum amount that may be lost on a particular trading order 152, for example.

In some embodiments, product management module 138 is operable to create any number of betting products 150, including defining the relevant parameters of the betting product 150 (such as, for example, the type, the sport, event, player, horse, score, point spread and/or final standings position). As discussed above regarding the example betting product 150 on the number of runs scored by England in the cricket match, a trading order 152 may define the user's position on the underlying betting product 150 (buyer or seller, for example), the quote or "price" for the betting product 150, and the unit stake to be wagered on the betting product 150. In addition, product management module 138 may assign to each betting product 150 a suggested or estimated initial quote or "price." For example, in the example discussed above, product management module 138 may assign the betting product 150 an initial quote of 225-245 runs. In particular embodiments, product management module 138 is operable to base such quotes or prices on the quotes or prices determined for such betting products 150 by a known betting entity, such as a bookmaker, for example.

In addition, as mentioned above, product management module 138 determines and/or manages a risk factor 330 for each betting product 150 (or a risk factor 330 for each of the buyer and the seller of each betting product 150) representing an actual or estimated maximum amount of liability to which a user may be exposed by establishing a position (such as a buy or sell position) in that betting product 150.

As discussed above, in some embodiments, the risk factor 330 represents the actual or estimated maximum number of "ticks," or scoring units, for which the user may be liable on a particular betting product 150. In addition, as discussed above, the value of the risk factor 330 of a betting product 150 may represent the actual or estimated maximum amount that the buyer or seller of the betting product 150 could lose per unit of currency (such as $1/point or £1/goal, for example) wagered on the betting product 150. For example, if the risk factor 330 of a betting product 150 was equal to 3 goals, the actual or estimated maximum amount that a buyer of the betting product 150 could lose on a stake of £1/goal would be £3. Thus, as discussed below in greater detail, in some embodiments, the total liability for the buyer or seller is equal to the risk factor 330 of the betting product 150 multiplied by the monetary amount, or "unit stake," that the buyer or seller wagers on the betting product 150.

Product management module 138 may determine risk factors 330 for particular betting products 150 based at least on the actual maximum tick liability 352 associated with the betting product 150 and/or an estimated maximum tick liability 354 associated with the betting product 150. In some situations, such as for particular types of betting products 150, the actual maximum tick liability 352 is infinite or undefined. For example, for supremacy betting products 150, there is no limit to the final score differential for either team, and thus the actual maximum tick liability 352 for both the buyer and seller is infinite.

In some embodiments, product management module 138 may also determine a stop-loss tick liability 356 for particular betting products 150 for use with stop-loss trading orders 152 or stop-loss trading accounts 154, as discussed below.

In some embodiments, one or both of the actual maximum tick liability 352 and the estimated maximum tick liability 354 for particular betting products 150 are determined by product management module 138. In other embodiments, one or both of the actual maximum tick liability 352 and the estimated maximum tick liability 354 for particular betting products 150 may be determined by another entity (such as a bookmaker, for example) and supplied to product management module 138.

In some situations, product management module 138 may determine risk factors 330 for betting products 150 by selecting the lower of the actual maximum tick liability 352 and the estimated maximum tick liability 354 for the particular betting product 150.

The estimated maximum tick liability 354 for a betting product 150 may be based at least in part on statistical data regarding the event or events upon which the betting product 150 is based. For example, suppose a cumulative market betting product 150 representing a bet on the number of points scored in an American football game. The estimated maximum tick liability 354 for the betting product 150 may be determined based at least in part on the range of scores for a particular historical sample games, such as all American football games played over the previous five years, or all games over the previous three years between the two teams involved in the game associated with the betting product 150, for example. For example, in one embodiment the estimated maximum tick liability 354 may be based at least in part on a range of scores in which 95% of the historical sample of games fell within. For example, supposing that the total score in 95% of all American football games played over the previous five years fell within a 70 point spread (for example, between 10 and 80 total points), product management module 138 may determine that the estimated maximum tick liability 354 for buying or selling a betting product 150 on an American football game is half of that 70 point spread, or 35 points.

In this manner, trading platform 20 may be able to estimate the maximum possible tick liability (i.e., the estimated maximum tick liability 354) for buyers and sellers of various betting products 150, which may be used by balance management module 136 in managing one or more current balances 160 associated with users' trading accounts 154 over time, as discussed in greater detail below. In some embodiments, the estimated maximum tick liability 354 for the buyer and the seller remains constant for the duration of the betting product 150. Thus, in such embodiments, even as the so-far of the event or events underlying a betting product 150 changes, the estimated maximum tick liability 354 for the betting product 150 remains constant, as discussed below. In alternative embodiments, the estimated maximum tick liability 354 for the buyer and/or the seller of a betting product 150 may change over time. For example, in one embodiment, the estimated maximum tick liability 354 for the buyer and/or the seller of a betting product 150 may be updated during the underlying event based on the so-far of the event.

As mentioned above, in some embodiments, product management module 138 may determine one or more risk factors 330 for a betting product 150 by selecting the lower of the actual maximum tick liability 352 and the estimated maximum tick liability 354 for the betting product 150.

To illustrate, suppose that the quote on the American football betting product 150 is 30-33 points, and that the estimated maximum tick liability 354 for buying or selling the betting product 150 is 35 points. Further suppose that a first user (seller) makes a request to place a trading order 152 to sell the betting product 150 at the sell quote of 30 points, and a second user (buyer) makes a request to place a trading order 152 to buy the betting product 150 at the buy quote of 33 points.

For the buyer, the actual maximum tick liability 352 is equal to the buy quote, or price, (33 points) minus the initial minimum make-up (0 point), or 33 points, which represents the buyer's tick liability if the final score (make-up) is zero-zero. As discussed above, the estimated maximum tick liability 354 for the buyer is 35 points. Thus, the risk factor 330 for the buyer at the time the trade is executed is determined to be 33 points (the lower of 33 points and 35 points).

For the seller, the actual maximum tick liability 352 is infinite, since the total number of points which could be scored in the football game is theoretically infinite. As discussed above, the estimated maximum tick liability 354 for the seller is 35 points. Thus, the risk factor 330 for the seller at the time the trade is executed is determined to be 35 points (the lower of infinity and 35 points).

In some embodiments, each type of betting product 150 may have a set of rules defining how the risk factor 330 for each betting product 150 of that type is determined. Example rules for four types of betting products 150 mentioned above—namely, (1) cumulative market betting products, (2) indices betting products, (3) match bets, or supremacy betting products, and (4) time market betting products—are provided as follows.

(1) Cumulative market betting products. Cumulative market betting products 150 include markets that have a minimum make-up (typically zero), and the so-fars can only increase. For example, cumulative markets include the total of shirts numbers worn by goal-scorers by one or both teams in a football match, or the number of batsmen runs for one team in a cricket innings or match. The example betting product 150 discussed above regarding the total number of points scored in an American football game is a particular example of a cumulative market betting products 150.

As discussed above regarding the example American football betting product 150, the risk factor 330 for a buyer will be the lesser of the actual maximum tick liability 352 and the estimated maximum tick liability 354. The actual maximum tick liability 352 for the buyer is equal to the buy quote, or "price," minus the actual minimum make-up. In this situation, the actual minimum make-up is equivalent to the current so-far.

The risk factor 330 for a seller will also be the lesser of the actual maximum tick liability 352 and the estimated maximum tick liability 354. The actual maximum tick liability 352 for the seller is equal to the actual maximum make-up minus the sell quote, or "price." Since the actual maximum make-up is typically infinite for a cumulative market betting product, the actual maximum tick liability 352 for the seller will typically be infinite. Thus, the risk factor 330 for the seller will be equal to the estimated maximum tick liability 354 for the seller.

The scenario discussed above regarding the example American football betting product 150 illustrates an example of determining initial risk factors 330 for both a buyer and a seller of a cumulative market betting product 150. As discussed above, for the buyer, the actual maximum tick liability 352 was 35 points, the estimated maximum tick liability 354 was 33 points, and the risk factor 330 was determined to be 33 points (the lower of 35 points and 33 points). For the seller, the actual maximum tick liability 352 was infinite, the estimated maximum tick liability 354 was 35 points, and the risk factor 330 was determined to be 35 points (the lower of infinity and 35 points).

Further suppose that at half-time, the score of the football game is 21-7, for a total of 28 points scored. The actual minimum make-up (equal in this situation to the so-far), which began at 0 points, is now 28 points. As discussed above, the actual maximum tick liability 352 for the buyer is equal to the buy quote minus the actual minimum make-up, which is now equal to 33 points minus 28 points, or 5 points. Assuming an embodiment in which the estimated maximum tick liability 354 for the betting product 150 remains constant throughout the duration of the betting product 150 (as discussed above), the estimated maximum tick liability 354 for the buyer remains constant at 33 points. Thus, since the risk factor 330 for the buyer is equal to the lower of the actual maximum tick liability 352 and the estimated maximum tick liability 354, the risk factor 330 for the buyer may be updated from 33 points (prior to the game) to 5 points (at half-time).

For the seller, the actual maximum tick liability 352 is equal to the actual maximum make-up minus the sell quote, which is still theoretically infinite. The estimated maximum tick liability 354 for the seller may increase from 33 points since it is likely (based on the fact that 28 points were scored in the first half) that more than 33 points will be scored in the game. For example, suppose the estimated maximum tick liability 354 for the seller increases from 33 points to 52 points. Thus, the risk factor 330 for the seller may be updated from 33 points (prior to the game) to 52 points (at half-time).

Thus, it can be seen that the estimated maximum tick liability 354 for the seller of a betting product 150 may change during the event or events underlying the betting product 150. Similarly, in some situations, the estimated maximum tick liability 354 for the buyer of a betting product 150 may change during the event or events underlying the betting product 150.

Thus, as shown in the example discussed above, product management module 138 may update the risk factors 330 for buyer and/or sellers of various betting products 150 during the lifetime of such betting products 150. For example, product management module 138 may update the risk factors 330 of various betting products 150 each time one or more relevant parameters of the risk factors 330 change, such as the actual minimum make-up, the actual maximum make-up, the so-far, the actual maximum tick liability 352 and/or the estimated maximum tick liability 354, for example. In some embodiments, such updates to risk factors 330 are made periodically or substantially in real time, and may be used to update other parameters, such as the risk values 332 of the associated trading orders 152, one or more current balances 160 associated with the buyer's and/or seller's trading accounts 154, and/or the unit stake of one or more of the buyer's and/or seller's other unmatched trading orders 152 on trading platform 20, as discussed in greater detail below with reference to order management module 140, as well as the discussion of FIG. 10.

(2) Indices betting products. Indices betting products 150 include markets in which pre-defined awards are given to teams or players finishing in particular positions in the standings. For example, a league championship index 60/40/30/20/10 is an index in which the league champion is awarded 60 points, 2nd place is awarded 40 points, 3rd place is awarded 30 points, 4th place is awarded 20 points, and 5th place is awarded 10 points. An indices betting product 150 is typically a bet concerning the final standing of a particular team or player within the league. Thus, there may be a separate betting product 150 for each team or player in the league. For such betting products 150, each team or player has an initial actual minimum make-up of zero and an initial actual maximum make-up equal to the amount awarded to the champion (thus, for betting products 150 related to the example league championship index discussed above, the actual maximum make-up is 60 points). As the tournament or season progresses, the actual minimum make-up and/or the actual maximum make-up for each team may be different and may change over time. For example, suppose toward the end of a season, a team is in a position in which they can finish no worse than 4th place (equal to 20 points), but no better than 2nd place (equal to 40 points). At that point, for a betting product 150 for that team, the actual minimum make-up would be 20 points and the actual maximum make-up would be 40 points.

The estimated maximum tick liability 354 for buyers and/or sellers of indices betting products 150 may have any suitable values. For example, for the league championship index betting product 150 discussed above, the estimated maximum tick liability 354 for both buyers and sellers may be 15 points. Such values for the estimated maximum tick liability 354 for the buyer and/or seller may be any value determined by trading platform 20 or any other suitable entity, such as a bookmaker, and such values typically fall between the actual minimum make-up and the actual maximum make-up for the relevant betting product 150.

For buyers, the risk factor 330 of such indices betting product 150 will be the lesser of the actual maximum tick liability 352 and the estimated maximum tick liability 354. The actual maximum tick liability 352 for the buyer is equal to the buy quote, or "price," minus the actual minimum make-up.

For sellers, the risk factor 330 will also be the lesser of the actual maximum tick liability 352 and the estimated maximum tick liability 354. The actual maximum tick liability 352 for the seller is equal to the actual maximum make-up minus the sell quote, or "price." As discussed above, the estimated maximum tick liability 354 for the seller may be the same as the estimated maximum tick liability 354 for the buyer.

For example, suppose a trading order 152 based on an index market betting product 150 for the final position of the team in the league championship standings, as discussed above. Suppose a quote, or "price," for the betting product 150 is 24-26 points. For a buyer of the betting product 150, the initial risk factor 330 will be the lesser of the initial actual maximum tick liability 352 and the estimated maximum tick liability 354, as discussed above. The initial actual maximum tick liability 352 for the buyer is equal to the buy quote, or "price," minus the initial minimum make-up, which is equal to 26 points minus 0 points, or 26 points, while the estimated maximum tick liability 354 is 15 points. Thus, the initial risk factor 330 for the buyer is determined to be 15 points.

For the seller, the initial risk factor 330 will also be the lesser of the actual maximum tick liability 352 and the estimated maximum tick liability 354, as discussed above. The actual maximum tick liability 352 for the seller is equal to the initial actual maximum make-up minus the sell quote, or "price," which is equal to 60 points minus 24 points, or 34 points, while the estimated maximum tick liability 354 is 15 points. Thus, the initial risk factor 330 for the seller is also determined to be 15 points.

Further suppose that toward the end of the season, the team is in a position in which they can finish no worse than 4th place (equal to 20 points), but no better than 2nd place (equal to 40 points), as discussed above. At that point, for the betting product 150 traded between the buyer and seller, the actual minimum make-up would now be 20 points and the actual maximum make-up would now be 40 points.

For the buyer, the actual maximum tick liability 352 is equal to the buy quote, or "price," minus the actual minimum make-up (now 20 points), as discussed above, which is now equal to 26 points minus 20 points, or 6 points. The estimated maximum tick liability 354 for the buyer may remain constant at 15 points, as discussed above. Since the risk factor 330 for the buyer is the lesser of the actual maximum tick liability 352 (6 points) and the estimated maximum tick liability 354 (15 points), the risk factor 330 for the buyer may be updated to become 6 points.

For the seller, the actual maximum tick liability 352 is the actual maximum make-up (now 40 points) minus the sell quote, or "price," as discussed above, which is now equal to 40 points minus 26 points, or 14 points. The estimated maximum tick liability 354 for the seller may remain constant at 15 points, as discussed above. Since the risk factor 330 for the seller is the lesser of the actual maximum tick liability 352 (14 points) and the estimated maximum tick liability 354 (15 points), the risk factor 330 for the seller may be updated to become 14 points.

Figures 3, 10:
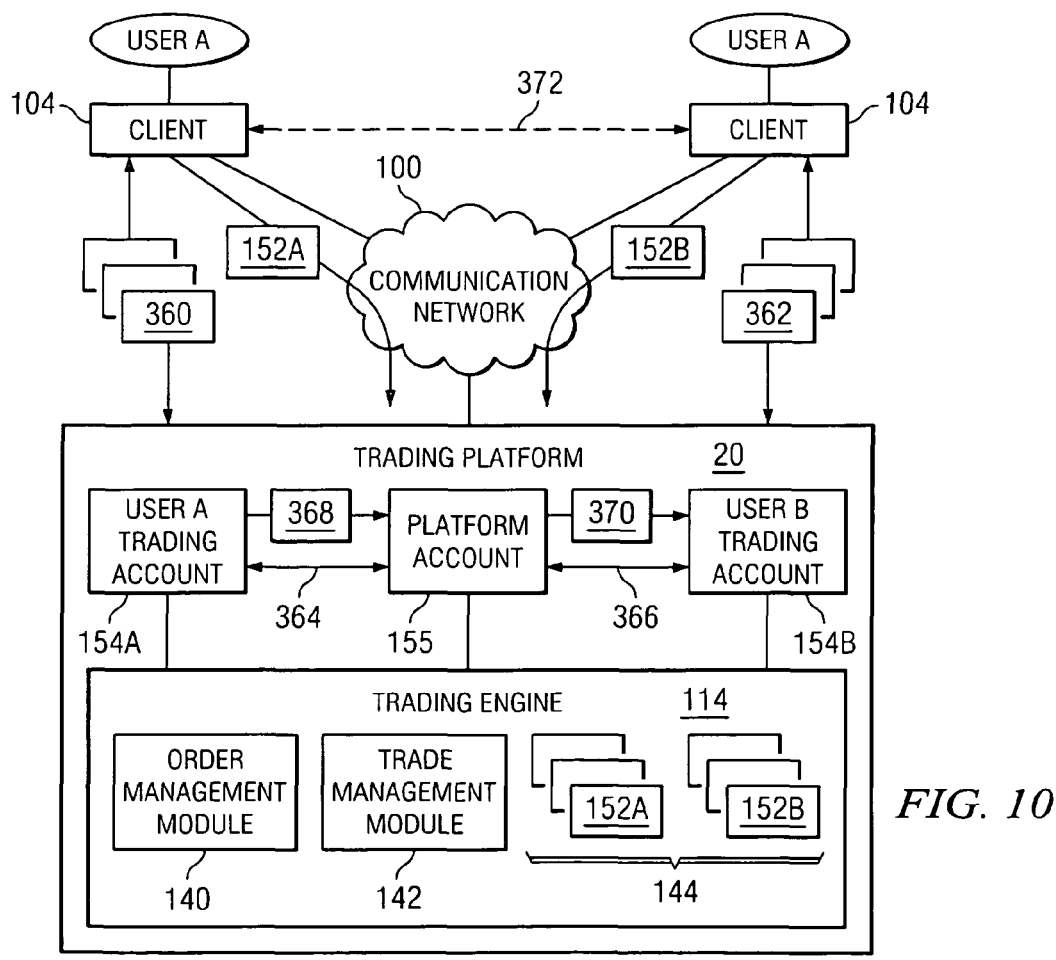
FIG. 3 illustrates one embodiment of an approval decision matrix that may be used to make account approval determinations for prospective users of the trading platform of FIGS. 1A and 1B.
FIG. 10 illustrates the trading platform of FIGS. 1A and 1B acting as an intermediary between users involved in a trade in accordance with an embodiment of the present invention.

As discussed above, such updates to the buyer's and/or seller's risk factors 330 may be made periodically or substantially in real time, and may be used to update other parameters, such as the risk values 332 of the associated trading orders 152, one or more current balances 160 associated with the buyer's and/or seller's trading accounts 154, and/or the unit stake of one or more of the buyer's and/or seller's other unmatched trading orders 152 on trading platform 20, as discussed in greater detail below with reference to order management module 140, as well as the discussion of FIG. 10.

(3) Match bets and supremacy betting products. Match bets and supremacy betting products 150 include bets on the final score of a sporting event, such as a bet on the goal differential in an English football match, for example. Some match or supremacy betting products 150 do not have an actual maximum or minimum make-up. For example, a supremacy bet for an English football match does not have either an actual maximum or minimum make-up, since either team may win by any amount of goals. Such betting products 150 may be called open-ended match or supremacy betting product 150. For match bets and supremacies, the so-far does not affect the buyer's or seller's risk factor 330, since the so-far does not affect the actual maximum tick liability 352.

For open-ended match or supremacy betting products 150, the risk factor 330 for both the buyer and seller may be equal to the estimated maximum tick liability 354 for the buyer and seller, respectively, since the actual maximum tick liability 352 for both the buyer and seller is infinite or undefined. The estimated maximum tick liability 354 for the buyer and seller may be any value determined by trading platform 20 or any other suitable entity, such as a bookmaker, for example. In addition, as discussed above, the estimated maximum tick liability 354 for the seller may be the same as the estimated maximum tick liability 354 for the buyer. For example, in one embodiment, an estimated maximum tick liability 354 of 3 goals is generally used for both buyers and sellers of English Premier League football match or supremacy betting products 150. Thus, the risk factor 330 for both buyers and sellers of such betting products 150 will also be 3 goals.

Other match or supremacy betting products 150 may have an actual minimum make-up and/or an actual maximum make-up. For example, a horse race match bet may have an actual minimum make-up of negative 12 positions and an actual maximum make-up of positive 12 positions. Such betting products 150 may be called constrained match or supremacy betting products 150. For buyers of such constrained match or supremacy betting products 150, the risk factor 330 may be equal to the lesser of the actual maximum tick liability 352 and the estimated maximum tick liability 354. The actual maximum tick liability 352 for the buyer is equal to the buy quote, or "price," minus the actual minimum make-up. For sellers of such constrained match or supremacy betting products 150, the risk factor 330 will also be the lesser of the actual maximum tick liability 352 and the estimated maximum tick liability 354. The actual maximum tick liability 352 per share for the seller is equal to the actual maximum make-up minus the sell quote, or "price." The estimated maximum tick liability 354 for the seller may be the same as the estimated maximum tick liability 354 for the buyer.

In some situations, no estimated maximum tick liability 354 may be provided for a constrained match or supremacy betting product 150. In such situations, the risk factor 330 for the buyer and seller will be equal to the actual maximum tick liability 352 for the buyer and seller, respectively. For example, suppose a horse race betting product 150 having an actual minimum make-up of negative 12 positions, an actual maximum make-up of positive 12 positions, and no estimated maximum tick liability 354. Suppose the betting product 150 was traded at a spread of 2.3-2.5 positions. The risk factor 330 for the buyer will be equal to the actual maximum tick liability 352 for the buyer, which, as discussed above, is equal to the buy quote, or "price," minus the actual minimum make-up, which is equal to 2.3 positions minus (−12 positions), or 14.3 positions. The risk factor 330 for the seller will be equal to the actual maximum tick liability 352 for the seller, which, as discussed above, is equal to the maximum make-up minus the sell quote, or "price," which is equal to 12 positions minus 2.5 positions, or 9.5 positions. As discussed above, the so-far for such a betting product 150 does not affect the buyer's or seller's risk factor 330, since the so-far does not affect the actual maximum tick liability 352 for the buyer or seller (in other words, a horse which is in 4th position after ½ of the race may finish the race in any position).

(4) Time market betting products. Time market betting products 150 include bets regarding the timing of particular events within a sporting match or season, for example. Such betting products 150 generally have both an actual minimum make-up and an actual maximum make-up. For example, suppose a time market betting product 150 comprising a bet on the time of the minute of the first goal in a football match. Such a betting product 150 may have an actual minimum make-up of 1 minute (if the first goal is scored in the first minute) and an actual maximum make-up of 90 minutes (if the first goal is scored in the 90th minute or beyond, or if no goals are scored).

For buyers, the risk factor 330 will be the lesser of the actual maximum tick liability 352 and the estimated maximum tick liability 354. The actual maximum tick liability 352 for the buyer is equal to the buy quote, or "price," minus the actual minimum make-up. In this situation, the actual minimum make-up is equivalent to the current so-far. For sellers, the risk factor 330 will also be the lesser of the actual maximum tick liability 352 and the estimated maximum tick liability 354. The actual maximum tick liability 352 for the seller is equal to the actual maximum make-up minus the sell quote, or "price."

The estimated maximum tick liability 354 for both the buyer and seller may be any value determined by trading platform 20 or any other suitable entity, such as a bookmaker, and typically has a value between the actual minimum make-up and the actual maximum make-up. For example, in the example discussed above (the bet on the time of the minute of the first goal in a football match), the estimated maximum tick liability 354 for both the buyer and the seller may be 45 minutes.

For example, suppose a trading order 152 based on a time market betting product 150 for the minute of the first goal in a football match is traded at a quote of 35-38 minutes. Suppose the estimated maximum tick liability 354 both buyers and sellers of this betting product 150 is 45 minutes. For the buyer, the initial risk factor 330 will be equal to the lesser of the initial actual maximum tick liability 352 and the estimated maximum tick liability 354, as discussed above. The initial actual maximum tick liability 352 for the buyer is equal to the buy quote, or "price," minus the initial actual minimum make-up, which is equal to 38 minutes minus 1 minute, or 37 minutes, while the estimated maximum tick liability 354 is 45 minutes. Thus, the initial risk factor 330 for the buyer is determined to be 37 minutes.

For the seller, the initial risk factor 330 will also be the lesser of the actual maximum tick liability 352 and the estimated maximum tick liability 354, as discussed above. The actual maximum tick liability 352 for the seller is equal to the initial maximum make-up minus the sell quote, or "price," which is equal to 90 minutes minus 35 minutes, or 55 minutes, while the estimated maximum tick liability 354 is 45 minutes. Thus, the initial risk factor 330 for the seller is determined to be 45 minutes.

During the football match, the actual minimum make-up and the actual maximum make-up change over time (at least before the first goal is scored). In particular, the current actual minimum make-up tracks the current minute of the game, while the current actual maximum make-up equals the initial actual maximum make-up (90 minutes) minus the current minute of the game. Thus, for example, in the 18th minute of the game (assuming the first goal has not been scored), the current actual minimum make-up is 18 minutes, and the current actual maximum make-up is 90 minutes.

The risk factors 330 for the buyer and seller may be calculated and updated as the actual minimum and maximum make-ups are updated during the match. For example, in the 18th minute, the actual maximum tick liability 352 for the buyer is equal to the buy quote, or "price," minus the current actual minimum make-up, which is equal to 38 minutes minus 18 minutes, or 20 minutes. Since this value (20 minutes) is less than the estimated maximum tick liability 354 for the buyer (45 minutes), the current risk factor 330 for the buyer would be 20 minutes. For the seller, the actual maximum tick liability 352 would be equal to the current actual maximum make-up minus the sell quote, or "price," which is equal to 72 minutes minus 35 minutes, or 37 minutes. Since this value (37 minutes) is less than the estimated maximum tick liability 354 for the seller (45 minutes), the current risk factor 330 for the seller would be 34 minutes.

As discussed above, such updates to the buyer's and/or seller's risk factors 330 may be made periodically or substantially in real time, and may be used to update other parameters, such as the risk values 332 of the associated trading orders 152, one or more current balances 160 associated with the buyer's and/or seller's trading accounts 154, and/or the unit stake of one or more of the buyer's and/or seller's other unmatched trading orders 152 on trading platform 20, as discussed in greater detail below with reference to order management module 140, as well as the discussion of FIG. 10.

In some embodiments, more than one estimated maximum tick liability 354 may be determined for buyers and/or sellers of particular betting products 150. For example, in one embodiment, a low-risk estimated maximum tick liability 354 and a high-risk estimated maximum tick liability 354 are determined for buyers and sellers of each betting product 150. The low-risk estimated maximum tick liability 354 may be used for buyers and/or sellers who are determined by one or more criteria to be relatively low-risk users, whereas the high-risk estimated maximum tick liability 354 may be used for buyers and/or sellers who are determined by one or more criteria to be relatively high-risk users. Generally, the low-risk estimated maximum tick liability 354 for a particular betting product 150 is equal to or lower than the high-risk estimated maximum tick liability 354 for the same betting product 150. As a result, for some such betting products 150, the amount required for a user identified as a low-risk user to trade the betting product 150 may be less then the amount required for a user identified as a high-risk user to trade the same betting product 150 (assuming the quote, or "price," and unit stake wagered on the betting product 150 are the same for the users). This may allow low-risk users to generally make more trades than similarly-funded high-risk users.

Order management module 140 is generally operable to receive trading orders 152 from users and to manage such trading orders 152 over time. Users having trading accounts 154 with trading platform 20 may trade (such as by buying and selling) various betting products 150 with each other using trading platform 20 via communications network 100. In order to trade a betting product 150, a user requests that a trading order 152 regarding the betting product 150 be placed on trading platform 20, such as by using browser application 116 to select the betting product 150 and set a quote, or "price," and unit stake wagered on the betting product 150 desired to be traded. Order management module 140 receives the user's request to place the trading order 152 and determines whether to approve the request based on one or more various factors. Order management module 140 may then place the trading order 152 on trading platform 20 if the request is approved.

In some embodiments, order management module 140 may determine whether to approve a user's request to place a trading order 152 to trade a particular betting product 150 based at least in part on (1) one or more current balances 160 (or combinations thereof) of the user's trading account 154 and (2) the risk value 332 determined for the requested trading order 152. The risk value 332 for each requested trading order 152 may represent the total actual or estimated likely maximum loss that the party requesting the trading order 152 may experience if the trade is executed.

As mentioned above, order management module 140 determines the risk value 332 for each requested trading order 152 based at least in part on the risk factor 330 determined by product management module 138 for the one or more underlying betting products 150. In some embodiments, the risk value 332 for each trading order 152 is generally determined by multiplying the risk factor 330 determined for the position of the requesting user (buy or sell) on the underlying betting product 150 by the unit stake wagered on the betting product 150, as defined by the requested trading order 152. The unit stake wagered on a betting product 150 may be represented in terms of monetary amount per appropriate tick or scoring unit. Thus, examples of the unit stake on various betting products 150 include $10/point, £13/minute, and ¥50/goal.

To illustrate an example of determining such risk values 332, recall from above the cumulative market betting product 150 representing a bet on the total number of points scored in an American football game. Suppose product management module 138 assigns an estimated maximum tick liability 354 of 80 points to this betting product 150, as discussed above. Further suppose that a first user (the buyer) makes a request to place a first trading order 152 to buy this betting product 150, such as for $10/point (the unit stake), at a spread quote of 30-33 points, and a second user (the seller) makes a request to place a second trading order 152 to sell this betting product 150, such as for $15/point (the unit stake), at the same spread quote of 30-33 points.

For the buyer, the risk factor 330 will be the lesser of the actual maximum tick liability 352 and the estimated maximum tick liability 354. As discussed above, the actual maximum tick liability 352 is equal to the buy quote, or "price" (33 points) minus the actual minimum make-up (0 points), or 33 points, as discussed above. The estimated maximum tick liability 354 for the buyer is equal to 35 points, as discussed above. Thus, the risk factor 330 for the buyer is 33 points.

For the seller, the risk factor 330 will also be the lesser of the actual maximum tick liability 352 and the estimated maximum tick liability 354. As discussed above, the actual maximum tick liability 352 is equal to the actual minimum make-up minus the sell quote, or "price," which result is infinite, as discussed above. The estimated maximum tick liability 354 for the seller is also equal to 35 points, as discussed above. Thus, the risk factor 330 for the seller is 35 points.

Order management module 140 may then determine the risk value 332 for each of the buyer and the seller by multiplying the risk factor 330 determined for the buyer and the seller, respectively, by the unit stake wagered on the betting product 150, as defined by each requested trading order 152. Thus, order management module 140 would determine the risk value 332 for the buyer to be $330 (in other words, 33 points*$10/point) and the risk value 332 for the seller to be $525 (in other words, 35 points*$15/point). Thus, as determined by order management module 140, the likely maximum total loss for the buyer is $330 and the likely maximum total loss for the seller is $525.

In addition, order management module 140 may update the risk value 332 of each trading product 152 during the lifetime of the respective trading product 152. For example, order management module 140 may update the risk value 332 of matched and/or unmatched trading products 152 each time one or more relevant parameters of the risk factor 330 of the underlying betting product 150 changes, such as the actual minimum make-up, the actual maximum make-up, the so-far, the actual maximum tick liability 352 and/or the estimated maximum tick liability 354, for example. In some embodiments, such updates to the risk values 332 are made periodically or substantially in real time, and may be used to update other parameters, such as one or more current balances 160 associated with the buyer's and/or seller's trading accounts 154, and/or the unit stake of one or more of the buyer's and/or seller's other unmatched trading orders 152 on trading platform 20, as discussed in greater detail below with reference to order management module 140, as well as the discussion of FIG. 10.

To determine whether to approve a user's request to place a trading order 152 to buy or sell a particular betting product 150, order management module 140 may use any suitable methodology, which may include various equations or algorithms, such as described below with reference to FIGS. 5A through 5E, for example. In some embodiments, such as described below with reference to FIGS. 5A through 5E, such methodology may be based at least on the risk value 332 determined for the requested trading order 152 and one or more initial balances 158 and/or current balances 160 associated with the relevant trading account 154. For example, the approval determination may include one or more comparisons of the risk value 332 of the requested trading order 152 with one or more initial balances 158, current balances 160 and/or combinations of such balances 158 and/or 160.

In some embodiments, order management module 140 may determine an amount available for trading 620 in the relevant trading account 154 based at least on one or more initial balances 158 and/or current balances 160 associated with the trading account 154. In one embodiment, the amount available for trading 620 in the trading account 154 must be greater than or equal to the risk value 332 for the requested trading order 152 in order for the requested trading order 152 to be approved to be placed on trading exchange 20.

In addition, order management module 140 may determine whether or not a margin call is appropriate, as well as the amount of such margin call, for a trading account 154 based at least on one or more initial balances 158 and/or current balances 160 associated with the trading account 154, such as discussed below with reference to FIG. 5C, for example.

A stop-loss trading account 154 generally allows a user to limit or cap his or her potential liability for trading particular betting products 150. In some embodiments, the users potential losses from trading particular betting products 150 may be limited, while the user's potential gains from trading such betting products 150 may be unlimited. In alternative embodiments, the user's potential gains may be limited along with the user's potential losses.

With a stop-loss trading account 154, the user's liability for trading a particular betting product 150 may be limited based at least on the stop-loss tick liability 356 associated with the betting product 150. The stop-loss tick liability 356 for a betting product 150 may define the maximum tick liability to which a user having a stop-loss trading account 154 may be exposed on the betting product 150. For example, suppose a betting product 150 regarding an American football game has a stop-loss tick liability 356 of 75 points. If a user sells this betting product 150 using a stop-loss trading account 154, the user's maximum tick liability will be 75 points. Thus, the seller will not be liable for any points scored above 75 points. Thus, if the user placed a trading order 152 to sell $10 (unit stake) of this betting product 150, the user's total potential loss on the trading order 152 is capped at $750, regardless of how many points are scored in the game.

Thus, in some embodiments, a user having a stop-loss trading account 154 may place particular trading orders 152 for which the user's potential losses are limited, but potential gains are (at least theoretically) unlimited. To account for this imbalance, trading exchange 20 may use a larger spread between the buy price and sell price for trading betting products 150 using stop-loss trading accounts 154 than would otherwise be used. For example, trading exchange 20 may use a five point spread for trading betting products 150 using stop-loss trading accounts 154 as opposed to a three point spread for trading betting products 150 using other types of trading accounts 154 (i.e., non-stop-loss accounts).

As discussed above, the stop-loss tick liability 356 for particular betting products 150 may be determined by product management module 138. Alternatively, the stop-loss tick liability 356 for particular betting products 150 may be determined by a third party entity and communicated to product management module 138. The stop-loss tick liability 356 for a particular betting product 150 may be different than the estimated maximum tick liability 352 for that betting product 150. The stop-loss tick liability 356 for a betting product 150 is typically greater than the estimated maximum tick liability 352 for that betting product 150. For example, for a betting product 150 regarding American football, the estimated maximum tick liability 352 may be 45 points and the stop-loss tick liability 356 may be 75 points. However, for particular betting products 150, the stop-loss tick liability 356 may be lower than the estimated maximum tick liability 352.

It should be understood that although stop-loss trading accounts 154 are described above, particular betting products 150 or trading orders 152 may be designated as stop-loss betting products 150 or trading orders 152, apart from being used along with a stop-loss trading account 154. Thus the stop-loss concept may apply separately or jointly to betting products 150, trading orders 152 and/or trading accounts 154.

Although the concepts regarding determining and utilizing risk factors 330 for betting products 150 and risk factors 332 for trading orders 152 are discussed with reference to a trading platform 20, it should be understood that in various embodiments some or all of such concepts similarly apply beyond the context of a trading platform in which users' trading orders are traded or matched. For example, risk factors 330 and/or risk values 332 may be used in connection with betting products 150 and/or trading orders 152 traded or placed with an online bookmaker or sportsbook. As another example, risk factors 330 and/or risk values 332 may be used in connection with betting products 150 and/or trading orders 152 traded or placed at a physical wagering facility, such as a casino sportsbook, a bookmaker, or an off-track betting (OTB) facility, for example.

Order management module 140 may also manage the trading orders 152 placed on trading platform 20. For example, order management module 140 may organize trading orders 152 for various users, based on various betting products 150, and at various quotes, or "prices." In some embodiments, order management module 140 stores (or causes storage of) trading orders 152 into one or more queues 144. Trading orders 152 may be stored in such queues 144 in a predefined manner, such as according to a FIFO (first in, first out) basis and/or according to the offered price of each trading order 152, for example. Each queue 144 may include trading orders 152 for a particular position (for example, a buy or sell position) for a particular betting product 150. In addition, trading orders 152 for a particular position on a particular betting product 150, but offered for at different quotes, or "prices," may be stored in separate queues 144.

Executing Trades

Trade management module 142 is generally operable to identify trading orders 152 which may be matched, and to match such trading orders 152 to execute trades. Generally, trade management module 142 identifies matches between trading orders 152 to buy particular betting products 150 and trading orders 152 to sell the same betting products 150. Trade management module 142 may identify trading orders 152 to be matched, or in other words, to determine whether to match particular trading orders 152, based at least on the relative quotes, or "prices," defined by the trading orders 152. For example, in some embodiments or scenarios, trade management module 142 may only match buy and sell trading orders 152 having the same quote or price. In other scenarios, trade management module 142 may match orders in which the quote or price for the buy order 152 is greater than or equal to the quote or price for the corresponding sell order 152. In still other embodiments or scenarios, trade management module 142 may only match orders in which the quote or price for the buy order 152 is greater than the quote or price for the corresponding sell order 152 by a predetermined amount or percentage. In this manner, trade management module 142 may match trading orders 152 to execute trades.

In still other embodiments or scenarios, trade management module 142 may match orders in which the quote or price for the buy order 152 is greater than or equal to the quote or price for the corresponding sell order 152, as well as orders in which the quote or price for the buy order 152 is lower than, but within a particular price differential of, the quote or price for the corresponding sell order 152.

As discussed above, order management module 140 may store (or cause the storage of) trading orders 152 in queues in a predefined manner, such as according to a FIFO (first in, first out) basis and/or according to the offered quote or price of each trading order 152. Trade management module 142 may utilize such queues 144 in order to identify and determine whether to match particular trading orders 152. In addition, trade management module 142 may partially or fully match particular trading orders 152, depending on the unit stake of each trading order 152 involved in the trade. For example, suppose User A places a trading order 152 to sell a particular betting product 150, betting product X, for $10/point (unit stake) at 42 points (quote). Later, User B places a trading order 152 to sell betting product X for $5/point (unit stake) at 42 points (quote). Still later, User C places a trading order 152 to buy betting product X for $25/point (unit stake) at 42 points (quote).

Since User A's and User B's trading orders 152 may be stored in a first queue 144 in FIFO order, User A's order will be ahead of User B's order in first queue 144. Thus, trade management module 142 will first match $10/point of the unit stake of User C's buy order with the $10/point unit stake of User A's sell order to execute a first trade. Trade management module 142 will then proceed to the next order in first queue 144, namely User B's order, and match $5/point of the unit stake of User C's buy order with the $5/point unit stake of User B's sell order to execute a second trade. Order management module 140 may then store the remaining unmatched $10/point unit stake of User C's buy order in a second queue 144, which may be matched by subsequently requested sell orders for betting product X at (or below) a quote of 42 points.

In some embodiments, trade management module 142 notifies balance management module 136 each time a trade is fully or partially executed (in other words, each time a trading order 152 is fully or partially matched with another trading order 152), such that balance management module 136 may update one or more current balances 160 for the trading accounts 154 of each involved user. For example, when a trading order 152 is fully matched, balance management module 136 may increase the used margin balance 612 and decrease both the available waived margin balance 604B and the an available total margin balance 606B in both the buyer's and the seller's trading accounts 154 by an amount equal to the risk value 332 determined for the buyer's and the seller's relative positions in the trading order 152. When a trading order 152 is partially matched, balance management module 136 may increase the used margin balance 612 and decrease both the available waived margin balance 604B and the an available total margin balance 606B in each of the buyer's and the seller's trading accounts 154 by an amount equal to the risk factor 330 of the underlying betting product 150 for the buyer's and the seller's relative positions, multiplied by the portion of the unit stake of the trading order 152 which was matched. As discussed above, in some embodiments, balance management module 136 may reduce and/or increase one or more current balances 160 in the buyer's and/or seller's trading accounts 154 in a particular order. In this manner, balance management module 136 may manage various current balances 160 in each trading account 154 over time based on trading activity performed using such trading accounts 154.

In addition, balance management module 136 may update one or more current balances 160 for each relevant trading account 154 each time order management module 140 updates the risk value 332 of a trading order 152 placed on trading platform 20. For example, suppose in the example discussed above in regarding the American football game that 28 points have been scored by halftime. Product management module 138 may update the risk factor 330 for the buyer's from 33 points to 5 points, such as described above. As a result, balance management module 136 may update one or more current balances 160 for the buyer which are tied to the updated risk factor 330, such as the used margin balance 612, the available waived margin balance 604B or the available total margin balance 606B, for example. Such updated balances 160 may affect the amount available for trading 620 in the buyer's trading account 154.

In some embodiments, as balance management module 136 updates one or more current balances 160 for a particular user's trading account 154, order management module 140 may determine whether each remaining unmatched, or open, trading order 152 placed using that trading account 154 is still valid according to the updated current balances 160. For example, if balance management module 136 reduces the available waived margin balance 604B and the available total margin balance 606B in a trading account 154, which affects the amount available for trading 620 in the user's trading account 154, order management module 140 may determine whether the updated amount available for trading 620 is sufficient to maintain each remaining unmatched trading order 152 made using that trading account 154.

For example, order management module 140 may compare the risk value 332 of each remaining unmatched trading order 152 with the updated amount available for trading 620 in the trading account 154. For each trading order 152, if the risk value 332 of that trading order 152 is less than or equal to the updated amount available for trading 620, the trading order 152 is unaffected. However, for each trading order 152 having a risk value 332 greater than the updated amount available for trading 620, the unit stake of that trading order 152 may be reduced such that the risk value 332 of the trading order 152 is reduced to an amount equal to (or less than) the updated amount available for trading 620.

For example, suppose a user has a trading account 154 having an amount available for trading 620 of $10,000 and several open trading orders 152, including the following:
Order A: sell order for $200/point at 15 points; risk factor of 15 points for a risk value of $3,000.
Order B: buy order for $200/run at 50 runs; risk factor of 30 runs for a risk value of $6,000.
Order C: sell order for $3,000/goal at 4.5 goals; risk factor of 3 goals for a risk value of $9,000.

Suppose that Order A is fully matched, and that balance management module 136 reduces the amount available for trading 620 in trading account 154 by the amount equal to the risk value 332 of Order A ($3,000) from $10,000 to $7,000. Order management module 140 may then determine whether the updated amount available for trading 620 of $7,000 is sufficient to maintain each of the user's remaining unmatched trading orders 152, namely Order B and Order C. Since the risk value 332 of Order B ($6,000) is less than the updated amount available for trading 620 of $7,000, Order B remains unaltered. However, since the risk value 332 of Order C ($9,000) is greater than the updated amount available for trading 620 of $7,000, the unit stake of Order C is reduced from $3,000/goal to $2,333.33/goal such that the updated risk value 332 of Order C is $7,000 (in other words, 3 goals*$2,333.33/goal).

In some embodiments, order management module 140 may increase the unit stake of trading orders 152 that were previously decreased, such as described above, if the amount available for trading 620 in the relevant trading account 154 is increased. For example, in the example discussed above, if the amount available for trading 620 in the user's trading account 154 is subsequently increased above $7,000, the unit stake of Order C may be increased accordingly up to the original $3,000/goal.

Third-Party Intermediary

In some embodiments, trade management module 142 is generally operable to allow trading platform 20, or trading engine 114, to act as an intermediary or agent between various users having trading accounts 154 with trading platform 20. For example, when trading orders 152 for a particular betting product 150 are matched (in other words, when a trade is executed), trade management module 142 may be operable to establish financial obligations between trading platform 20 and each user involved in the executed trade.

In addition, when the underlying event or events upon which the particular betting product 150 is based transpire, trade management module 142 may execute transactions between trading platform 20 and each involved user based at least on the results of the underlying event or events. Such transactions may include, for example, transferring funds or credit between platform account 155 and each involved user. For example, if User A and User B trade a particular betting product 150 and User B is victorious on the underlying bet such that User A owes funds to User B, trade management module 142 may execute a first transaction transferring funds or credit from User A's trading account 154 to platform account 155, and a second transaction transferring funds or credit from platform account 155 to User B's trading account 154. In some embodiments, trade management module 142 may execute such transactions independently such that each transaction does not depend on the execution of the other.

In this manner, trading platform 20 acts, in some embodiments, as an intermediary for effecting transactions between various users, such as the example Users A and B. In addition, although trade management module 142 creates obligations and executes a separate transaction with each user involved in a trade, it may appear to each user involved in the trade that that user is transacting directly with the other user. Thus, it may be said that trade management module 142 effectuates a "virtual" transaction between the users involved in each trade.

The function and operation of trade management module 142 is described in greater detail below with reference to FIGS. 10 and 11.

Trading engine 114 may comprise a central processing unit (CPU) associated with an operating system that executes instructions and manipulates information in accordance with the operation of trading platform 20. The CPU of trading engine 114 maintains and executes instructions to implement the various features and functionalities associated with core servers 120 and database server 122, such as the functionalities provided by the various function modules 126 described above. Although the various components of trading engine 114 are illustrated as separate servers and modules, it should be understood that any suitable number and combination of servers, modules may, or processors be used to perform the various features and functionality of trading engine 114.

Figure 11:
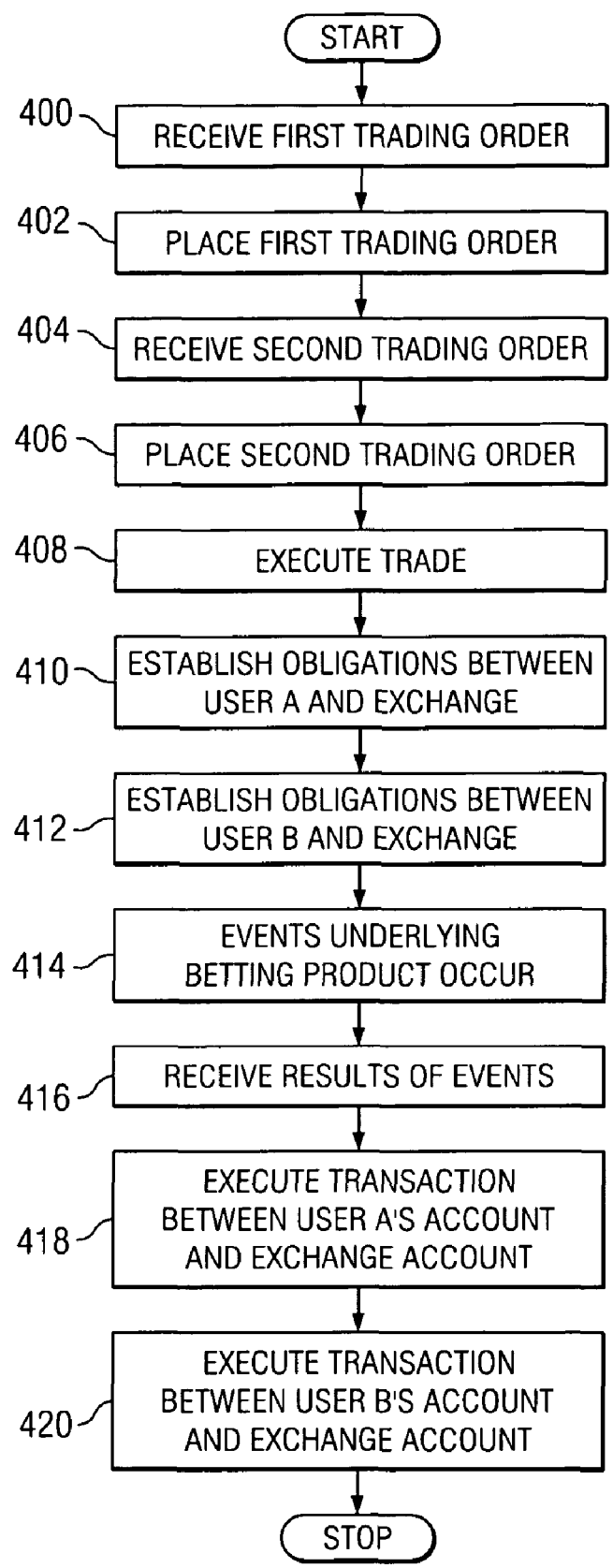
FIG. 11 illustrates an example method of using the trading platform of FIGS. 1A AND 1B as an intermediary between users involved in a trade in accordance with an embodiment of the present invention.

Although trading platform 20 or trading engine 114 may act as an intermediary or agent between various users in some embodiments (such as discussed above and in greater detail with reference to FIGS. 10 and 11), in other embodiments trading platform 20 allows users to trade directly with each other, including establishing financial obligations directly with each other.

Figure 2:
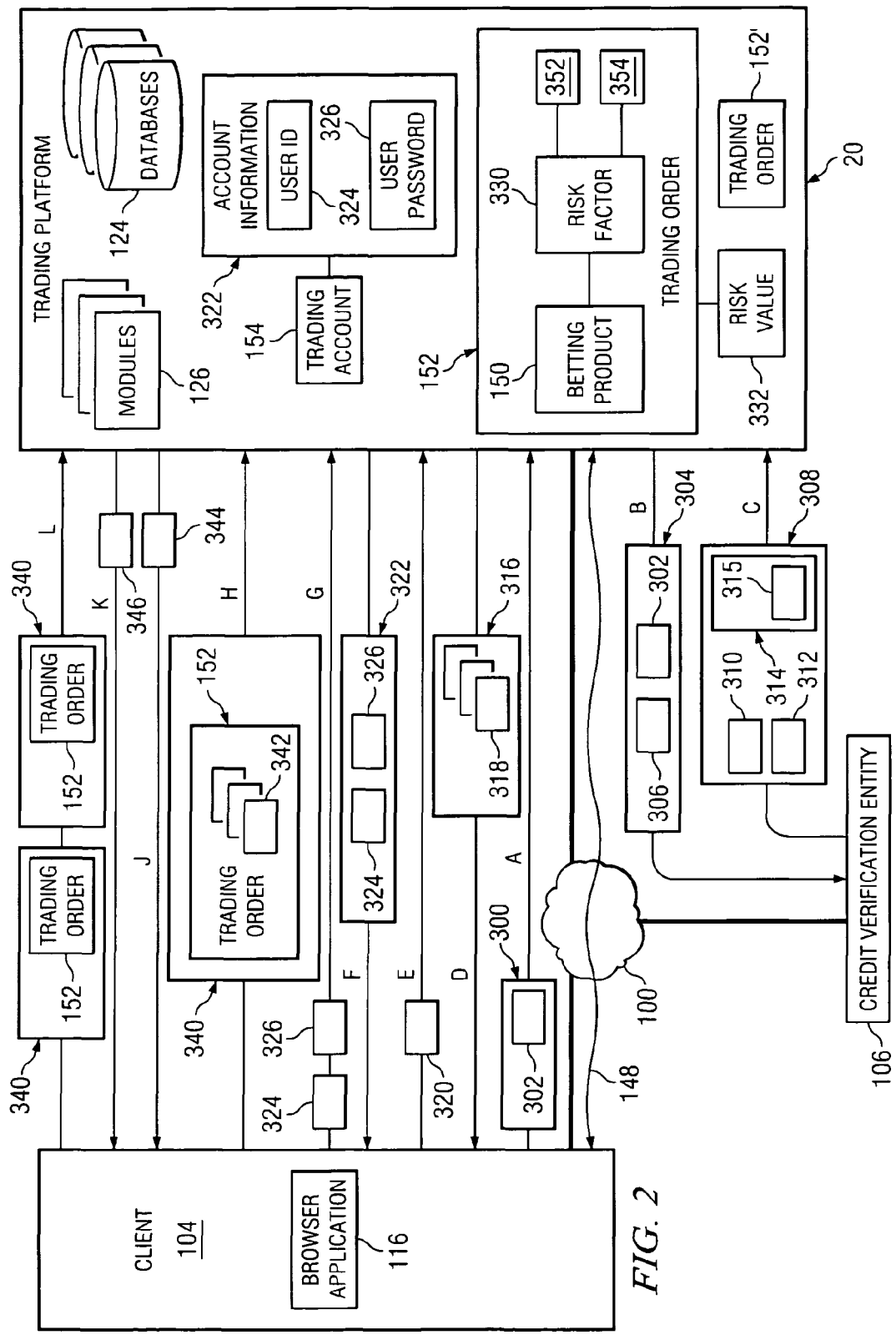
FIG. 2 illustrates an example operation of the system of FIGS. 1A and 1B in accordance with one embodiment of the present invention.

FIG. 2 illustrates an example operation of system 10 in accordance with one embodiment of the present invention. Trading platform 20 receives an account application 300 for a credit trading account 154 or a trading account 154 comprising a credit component (such as a hybrid credit/deposit account, for example), determines whether to approve the trading account 154, and opens the trading account 154, all during the same communication session 148 between a user operating client 104 and trading platform 20. In addition, trading platform 20 may allow the user to access the newly opened trading account 154 to begin placing trading orders 152, for example, during the same communication session 148 and/or substantially in real time.

For example, suppose a user wishes to open a trading account 154 with trading platform 20. The user may access one or more web pages associated with trading platform 20 via a communications network 100 using browser 116 hosted by a client 104 associated with the user, thus initiating communication session 148. Using the one or more web pages associated with trading platform 20, the user may complete an application 300 for one or more types of trading accounts 154 with trading platform 20, which may include entering identification information 302 (such as the user's name, address, telephone numbers, date of birth, and employment information, for example) into various fields of one or more account application web pages. The account application 300, or at least the identification information 302 regarding the user, is then communicated to credit and identity verification module 130 of trading platform 20 (see FIG. 2, arrow A). Credit and identity verification module 130 communicates a credit information request 304 to one or more credit verification entities 106 to obtain various identity and credit information 308 regarding the user (see FIG. 2, arrow B). The credit information request 304 includes at least a portion of the identification information 302 received from the user, as well as an indication 306 of the type of requested credit information 308.

In an alternative embodiment, the user's identification information 302 may be communicated directly to one or more credit verification entities 106 (in other words, without being routed through credit and identity verification module 130 of trading platform 20). For example, a particular credit verification entity 106 may have an agreement with trading platform 20 whereby the credit verification entity 106 may be operable to receive directly from a client 104 (in other words, without being routed through trading platform 20) a credit information request 304 for credit information 308, and the credit verification entity 106 may be able to identify from the credit information request 304 that the credit information request 304 is being made on behalf of trading platform 20 and thus retrieve and provide the requested credit information 308 to trading platform 20.

The one or more credit verification entities 106 may then retrieve, organize and analyze credit information 308 regarding the user based on the identification information 302 regarding the user received from trading platform 20 (or directly from the user, such as in the alternative embodiment discussed above). For example, a credit verification entity 106 may perform an identity authentication check and a credit check for the user by obtaining identification and credit information regarding the user from one or more internal and/or external electronic data bases. In particular embodiments, credit verification entity 106 may perform such identity authentication checks and credit checks in real time or substantially in real time. The one or more credit verification entities 106 may then communicate the requested credit information 308, including the results of the identity authentication check and the credit check, to credit and identity verification module 130 (see FIG. 2, arrow C). Such results may include an identity check score 310 and a credit check score 312, as well as one or more credit information details 314, such as one or more reason codes 315, as discussed in greater detail below with respect to FIGS. 3, 4A and 4B.

At this point, account approval module 132 of trading platform 20 determines whether to approve or deny each type of trading account 154 applied for by the user based at least on a portion of the credit information 308 (in other words, identity check score 310, credit check score 312 and/or credit information details 314) received from the one or more credit verification entities 106. For example, if the user applied for a credit account, a hybrid deposit/credit account, and a stop-loss deposit account, account approval module 132 determines whether to approve each of these types of trading accounts 154 for the user. In some embodiments, account approval module 132 applies an approval decision matrix 170 and an additional set of business rules 180 to the credit information 308 received from credit verification entities 106 in order to determine whether to approve each type of trading account 154.

Account approval module 132 may then communicate to client 104 via communications network 100, such as by e-mail or an appropriate web page, an approval notification 316 indicating one or more types of trading accounts 154, shown in FIG. 2 as approved trading account types 318, that were approved, or that the user should contact an operator of trading platform 20 for further instructions (see FIG. 2, arrow D). The user may then make and communicate to trading platform 20 a selection of one or more of the approved trading account types 318, shown in FIG. 2 as selected trading account type 320, that the user wishes to be opened (see FIG. 2, arrow E). The user may communicate such selection to trading platform 20 by sending an e-mail or by selecting the one or more desired types of trading accounts 154 from an appropriate web page using browser 116, for example.

Account establishment module 134 of trading platform 20 may then open the one or more selected trading account types 320 for the user. Supposing the user selected a credit trading account 154 to be opened, account establishment module 134 creates the credit trading account 154 for the user, which includes creating a set of account identification data 322 for the credit trading account 154. The account identification data 322 may include, for example, an account ID, a user ID 324, and a user password 326. In addition, balance management module 136 may determine one or more initial balances and/or limits 158 for the new credit account 154. One or more of such initial balances and/or limits 158 may be based at least in part on particular credit information 308 received from credit verification entities 106, or may be predetermined based on the type of trading account 154 opened for the user. Account establishment module 134 may then communicate the user ID 324 and user password 326 to the user via communications network 100, such as by an e-mail or an appropriate web page, for example (see FIG. 2, arrow F).

The user may then access the opened credit trading account 154 by entering his or her user ID 324 and/or user password 326 into a login web page provided by trading platform 20 (see FIG. 2, arrow G). Once the user has accessed his or her credit trading account 154, the user may begin trading activities within trading platform 20, such as making requests to place trading orders 152 to buy or sell betting products 150, for example.

Betting products 150 may be created and/or managed by product management module 138 at trading platform 20, as discussed above. In some embodiments, product management module 138 may assign an initial or suggested quote, or "price" to various betting products 150. In addition, product management module 138 may determine estimated tick liabilities 354 for buyers and sellers of various betting products 150. In some embodiments, or for some types of betting products 150, product management module 138 may determine one or more estimated tick liabilities 354 for buying each betting product 150 and one or more estimated tick liabilities 354 for selling each betting product 150, which may or may not be the same risk factors, depending on the embodiment and the particular betting product 150, as previously discussed.

Using the credit trading account 154, the user may make an order request 340 to place a trading order 152 to buy or sell a particular betting product 150 (see FIG. 2, arrow H). The user may make such order request 340 via communications network 100 during communication session 148. To make the order request 340, the user may specify one or more trading order parameters 342 that at least partially define the trading order 152, such as the underlying betting product 150, the offered quote, or "price," the unit stake, and the duration for which the user wishes the trading order 152 to remain open, for example.

Order management module 140 may determine a risk value 332 for the requested trading order 152, which may represent the actual or estimated likely total loss that the user may experience if the trading order 152 is placed and matched (in other words, if the trade is executed). Order management module 140 may then determine whether to approve the user's request to place the trading order 152.

To determine whether to approve the user's request to place the trading order 152, order management module 140 may use any suitable methodology, which may include various equations or algorithms, such as described below with reference to FIGS. 5A through 5E, for example. Such methodology may be based at least on the risk value 332 for the requested trading order 152 and one or more initial balances 158 and/or current balances 160 associated with the user's trading account 154.

In some embodiments, order management module 140 determines an amount available for trading 620 in the relevant trading account 154 based at least on one or more initial balances 158 and/or current balances 160 associated with the trading account 154. Order management module 140 may then compare the amount available for trading 620 in the user's trading account 154 with the risk value 332 for the requested trading order 152 to determine whether to approve the requested trading order 152. Order management module 140 may then communicate a notification 344 to the user indicating that the user's trading order 152 was placed, such as by e-mail or an appropriate web page (see FIG. 2, arrow J).

Trade management module 142 may then match the user's trading order 152 with another trading order, shown in FIG. 2 as trading order 152', to execute a trade. Trade management module 142 may communicate another notification 346 to the user indicating that the user's trading order 152 has been matched (in other words, that a trade has been executed), such as by e-mail or an appropriate web page (see FIG. 2, arrow K).

In addition, trade management module 142 may notify balance management module 136 that the trading order 152 was matched. Balance management module 136 may then adjust one or more current balances 160 in the user's credit trading account 154 by an amount equal to the risk value 332 determined for the user's trading order 152, which may affect the amount available for trading 620 in the user's trading account 154. The user may continue to make requests 340 to place additional trading orders 152 (see FIG. 2, arrow L), which will generally be approved so long as current amount available for trading 620 in the user's trading account 154 is greater than or equal to the risk value 332 determined for each trading order 152.

As new trading orders 152 are requested, placed, and matched over time, product management module 138, order management module 140, and balance management module 136 may cooperate to manage, or update, the risk value 332 of each betting product 150, the unit stake and/or risk value 332 of each trading order 152, and various current balances 160 associated with the trading account 154.

It should be understood that the particular operations, actions, or communications, the order of such operations, actions, or communication, as well as the types of messages or communications, described above with reference to FIG. 2 are provided merely to illustrate various example embodiments. Any other suitable operations, ordering of such operations, and types of communications may be used without departing from the scope of this disclosure.

FIG. 3 illustrates one embodiment of an approval decision matrix 170 that may be used to make account approval determinations for prospective users of trading platform 20. Approval decision matrix 170 comprises an identity authentication section 172, a credit check section 174, and an approval decision section 176, and indicates approval decisions for various types of trading accounts 154 for nine different scenarios or prospective users 178.

Identity authentication section 172 and credit check section 174 include various identity check scores 310 and credit check scores 312, respectively, received from one or more credit verification entities 106 regarding the various prospective users 178. For example, as discussed above, trading platform 20 may communicate a credit information request 304 to a particular credit verification entity 106 for credit information 308 regarding a prospective user attempting to open a trading account 154, for example. The credit information request 304 may include identification information 302 submitted by the prospective user, such as by entering such information into various fields in a web page associated with trading platform 20. Based on this identification information 302, the credit verification entity 106 may retrieve credit information 308 regarding the person identified by the identification information 302 from one or more internal or external electronic databases, such as post office databases, utility databases, voter registration rolls, and bank account databases, for example. Based on this retrieved credit information 308, credit verification entity 106 may calculate and return to trading platform 20 a credit check score 312 representing a level or quality of credit associated with the person identified by the identification information 302, as well as an identity check score 310 representing a level of assurance that the person identified by the identification information 302 by credit verification entity 106 is the same person as the prospective user.

The identity and credit check scores 310 and 312 received from credit verification entity 106 may be divided into score categories. For example, as shown in FIG. 3, the identity check score 310 may be divided into three categories, namely Identity Score A, Identity Score B, and Identity Score C. Suppose a credit verification entity 106 (such as EXPERIAN, for example) returns identity check scores 310, on a scale from 0 to 90. For the purposes of approval decision matrix 170, such identity check scores 310 may be assigned as follows: identity check scores 310 greater than or equal to 70 are classified under Identity Score A, identity check scores 310 greater than or equal to 40 but less than 70 are classified under Identity Score B, and identity check scores 310 less than 40 are classified under Identity Score C. Similarly, the credit check score 312 may be divided into three categories, namely Credit Score A, Credit Score B, and Credit Score C. For example, suppose a credit verification entity (such as EXPERIAN, for example) returns credit check scores 312 on a scale from 300-1200. For the purposes of approval decision matrix 170, such credit check scores 312 may be assigned as follows: credit check scores 312 greater than or equal to 1000 are classified under Credit Score A, credit check scores 312 greater than or equal to 700 but less than 1000 are classified under Credit Score B, and credit check scores 312 less than 700 are classified under Credit Score C.

Approval decision section 176 includes the approval decision for each of a variety of types of trading accounts 154 offered by trading platform 20 based on the identity check score 310 and credit check scores 312 for the particular scenario or prospective user 178. In the embodiment shown in FIG. 3, the types of trading accounts 154 offered by trading platform 20 comprise a large credit account (such as a credit account with credit limit 602A of $2,000), a small credit account (such as a credit account with credit limit 602A of $500), a deposit account, and a stop-loss deposit account. In some embodiments, trading platform 20 does not offer a stop-loss account. It should be understood that trading platform 20 may offer, and thus approval decision section 176 may include, any variety of suitable types of trading accounts 154.

Approval decision section 176 also includes an entry entitled "Call Trading Exchange" which represents a decision to notify the prospective user that he or she may call an operator of trading platform 20 to ask questions or to submit additional identification or credit information. Thus, as shown in the right side of approval decision section 176, in scenarios 6 through 9 in which the prospective user is denied each type of trading account 154, the prospective user may be directed to call an operator of trading platform 20 for further instructions.

As shown in FIG. 3, prospective users may be approved for zero, one, or more than one type of trading account 154 provided by trading platform 20. For example, according to approval decision matrix 170, prospective user number "2" is approved for a small credit account, deposit account and stop-loss deposit account, but not approved for a large credit account. As discussed above with reference to FIG. 1, account approval module 132 may notify prospective users, such as via e-mail or an appropriate web page, the particular types of trading accounts 154 for which they are approved and/or denied. Each prospective user may then select, such as using a browser application 116, one or more of the approved types of trading accounts 154 to be opened.

In some embodiments, making approval determinations may also include processing various credit information details 314 received from one or more credit verification entities 106. In some instances, such credit information details 314 may supplement or override decisions that would result from applying approval decision matrix 170 to the identity check score 310 and credit check score 312 for a particular prospective user.

One or more credit verification entities 106 may communicate credit information details 314 along with the identity check score 310 and/or credit check score 312 to trading platform 20. Such credit information details 314 may comprise information used by the credit verification entity 106 in determining a particular identity or credit check score 310 or 312. For example, a credit verification entity 106 may communicate to trading platform 20 one or more "reason codes" 315 indicating various information used in determining the identity check score 310 and/or credit check score 312 for a particular prospective user.

FIGS. 4A and 4B illustrate an example embodiment of a rules set 180 regarding credit information details 314 received from credit verification entities 106 for use in conjunction with approval decision matrix 170 to make account approval determinations. Rules set 180 includes a rules classification table 182, an identity check rules table 184, and a credit check rules table 186. Rules classification table 182 identifies three classifications of rules (A, B and C) used in identity check rules table 184 and credit check rules table 186, and a description of the relevance of each classification of rules. Identity check rules table 184 lists a number of relevant reason codes 315 that may be received from a credit verification entity 106 regarding the identity check performed for prospective users, a short description of the rule corresponding to each reason code 315, a full description of the rule corresponding to each reason code 315, and a rules classification for each reason code 315. The relevance of the rules classification corresponding to each reason code 315 is provided in rules classification table 182. Similar to identity check rules table 184, credit check rules table 186 lists a number of relevant reason codes 315 that may be received from one or more credit verification entities 106 regarding the credit check performed for prospective users, a short description of the rule corresponding to each reason code 315, a full description of the rule corresponding to each reason code 315, and a rules classification for each reason code 315. Again, the relevance of the rules classification corresponding to each reason code 315 is provided in rules classification table 182.

To illustrate the operation of rules set 180 along with approval decision matrix 170, suppose for example that for a particular prospective user, a credit verification entity 106 communicates to trading platform 20 an identity check score 310 of 45, a credit check score 312 of 850, and a credit check reason code 315 labeled RR32. According to the example categories for identity and credit check scores 310 and 312 discussed above, the identity check score 310 of 45 would correspond with the Identity Score B category, and the credit check score 312 of 850 would correspond with the Credit Score B category. Applying approval decision matrix 170, this example falls under scenario number "5," and according to approval decision section 176, the prospective user would be approved for a small credit account, a deposit account and a stop-loss deposit account. Next, rules set 180 may be applied to the received credit check reason code 315 labeled RR32. According to credit check rules table 186, the reason code 315 labeled RR32 is a Class A rule that, according to rules classification table 182, will not affect the approval decisions made according to approval decision matrix 170.

However, suppose that for the same prospective user, the credit verification entity 106 communicated to trading platform 20 the same identity check score 310 (45), credit check score 312 (850), and credit check reason code 315 (RR32), but additionally communicated identity check reason code 315 labeled RR11. Applying approval decision matrix 170, this second example still falls under scenario number "5". However, applying rules set 180 produces a different result. According to identity check rules table 184, the identity check reason code 315 labeled RR11 is a classification B rule and therefore, according to rules classification table 182, the prospective user cannot qualify for a credit account. Thus, although the prospective user would be approved for a small credit account according to approval decision matrix 170, this approval is overridden by the application of rules set 180 to the received identity check reason code 315 labeled RR11. Thus it can be seen that credit information details 314, such as reason codes 315, received from credit verification entities 106 may be used to supplement and/or override various decisions resulting from applying approval decision matrix 170.

FIGS. 5A though 5E illustrate an example methodology, as well as the application of the methodology for a variety of scenarios, for determining whether to approve a requested trading order 152. It should be understood that any other suitable methodologies may be used to make such determinations without departing from the scope of this disclosure.

FIG. 5A illustrates a set of current balances equations 500 that may be used to determine or manage various current balances 160 for each trading account 154 in accordance with one embodiment of the present invention. In some embodiments, current balances equations 500 may be used by order management module 140 in order to manage various current balances 160.

FIG. 5B illustrates an credit check decision matrix 510 for determining whether to approve a particular user's request to place a particular trading order 152 in accordance with one embodiment of the present invention. In some embodiments, order management module 140 may use decision matrix 512 to make such determinations. Credit check decision matrix 510 comprises six example credit check equations 512 which may be used by order management module 140 to determine whether to approve or reject the user's request to place the trading order 152. Credit check equations 512 numbered 1, 2, 4 and 6 comprise comparisons between one or more various current balances 160 associated with a trading account 154 and the risk value 332 of the requested trading order 152. Credit check equations 512 numbered 3 and 5 comprise equations to determine whether various current balances 160 are greater than zero. Row 514 indicates the determination of whether to approve or reject a requested trading order 152 based on credit check equations 512 for nine different scenarios.

FIG. 5C illustrates an example margin call decision matrix 520 which may be used by order management module 140 to determine whether a margin call is appropriate in accordance with one embodiment of the present invention. Margin call decision matrix 520 includes a first section 522, a section 524 and a third section 526. First section 522 comprises three example margin call equations 528 which may be used to determine whether to make a margin call for a trading account 154 based on various current balances 160 associated with the trading account 154. Second section 524 indicates the appropriate level of the margin call, or whether no margin call is appropriate, based on margin call equations 528 for six different scenarios. For example, according to scenario 6, if the user's available cash balance 600B is greater than or equal to zero, the user's available credit balance 602B is less than zero, and the sum of the user's available cash balance 600B and available credit balance 602B is greater than or equal to zero (see section 522), a margin call for the amount of the user's available cash balance 602B is appropriate (see section 524).

Third section 526 of matrix 520 indicates a method for determining the amount available for trading 620 in a user's trading account 154 based on margin call equations 528 for each of the six different scenarios. For example, for scenario 2, the amount available for trading 620 in the user's trading account 154 is equal to the greater of (1) zero and (2) the minimum of (a) the sum of the available waived margin balance 604B and the available cash balance 600B and (b) the available total margin balance 606B. In one embodiment, if amount available for trading 620 determined in section 526 of matrix 520 is greater than or equal to the risk value 332 for the requested trading order 152, the requested trading order 152 will be approved. Thus, section 526 of matrix 520 may comprise a summary of credit check decision matrix 510 shown in FIG. 5B.

FIGS. 5D and 5E illustrate a table 540 showing the determination of whether to approve or decline a request to place a trading order 152, as well as whether a margin call is appropriate, for eight example scenarios in accordance with one embodiment of the present invention. Row 542 indicates the risk value 332 for the requested trading order 152. In this example, the risk value 332 for the requested trading order 152 is $3,000 in each scenario. Section 544 illustrates various initial balances 158 for each scenario. Section 546 illustrates various current balances 160 for each scenario. Section 548 illustrates various intermediate calculations based on various initial balances 158 and current balances 160 for each scenario.

Section 550 illustrates the application of each of the six credit check equations 512 from check decision matrix 510 (see FIG. 5B) based on the risk value 332 for the requested trading order 152 and various current balances 160 and intermediate calculations shown in sections 546 and 548. Row 552 indicates the resulting decision of whether to approve or reject the request to place the trading order 152 based on the application of the credit check equations 512 for each of the eight scenarios.

Section 554 illustrates the application of the margin call equations 528 from margin call decision matrix 520 (see FIG. 5C) for each of the eight scenarios. Row 556 indicates the resulting margin call decision and amount determined based on the margin call equations 528 for each scenario.

Row 558 indicates the amount available for trading 620 in each scenario determined using the methodology shown in section 526 of matrix 520. Thus, as discussed above, if amount available for trading determined in section 526 of matrix 520 is greater than or equal to the risk value 332 for the requested trading order 152 (here, $3,000), the requested trading order 152 will be approved (which is consistent with the credit check results shown in row 552 of table 540.

FIG. 6 illustrates an embodiment of an account database 190 comprising any number of trading accounts 154 used in trading platform 20. Account database 190 includes for each trading account 154: an account ID, a user name, a user ID 324, a user password 326, each initial balance 158, each current balance 160, the type of trading account 154 (for example, credit, deposit, or stop-loss account), a list of open trading orders 152 (such as a list of order IDs, for example), and a list of executed trades. Account database 190 may be hosted by or separate from database server 122, and may be accessed by core servers 120 and/or one or more operator terminals 110 in order to store, update and/or retrieve information regarding various trading accounts 154.

FIG. 7 illustrates an embodiment of an open order database 192 comprising any number of open trading orders 152 placed on trading platform 20. Open order database 192 includes for each open trading order 152: an order ID, a user ID 324 of the user who placed the trading order 152, a product ID identifying the betting product 150 upon which the trading order 152 is based, whether the trading order 152 is a buy or sell order, the offered price (which may comprise the price per unit of the betting product 150, or the total price of the trading order 152), the stake or number of units included in the trading order 152, the risk factor 330 per unit of the betting product 150, the risk value 332 of the trading order 152, the time the trading orders 152 was placed, and the priority of the trading order 152 (in relation to other open trading orders 152). Like account database 190, open order database 192 may be hosted by or separate from database server 122, and may be accessed by core servers 120 and/or one or more operator terminals 110 in order to store, update and/or retrieve information regarding various trading orders 152.

Figure 8:
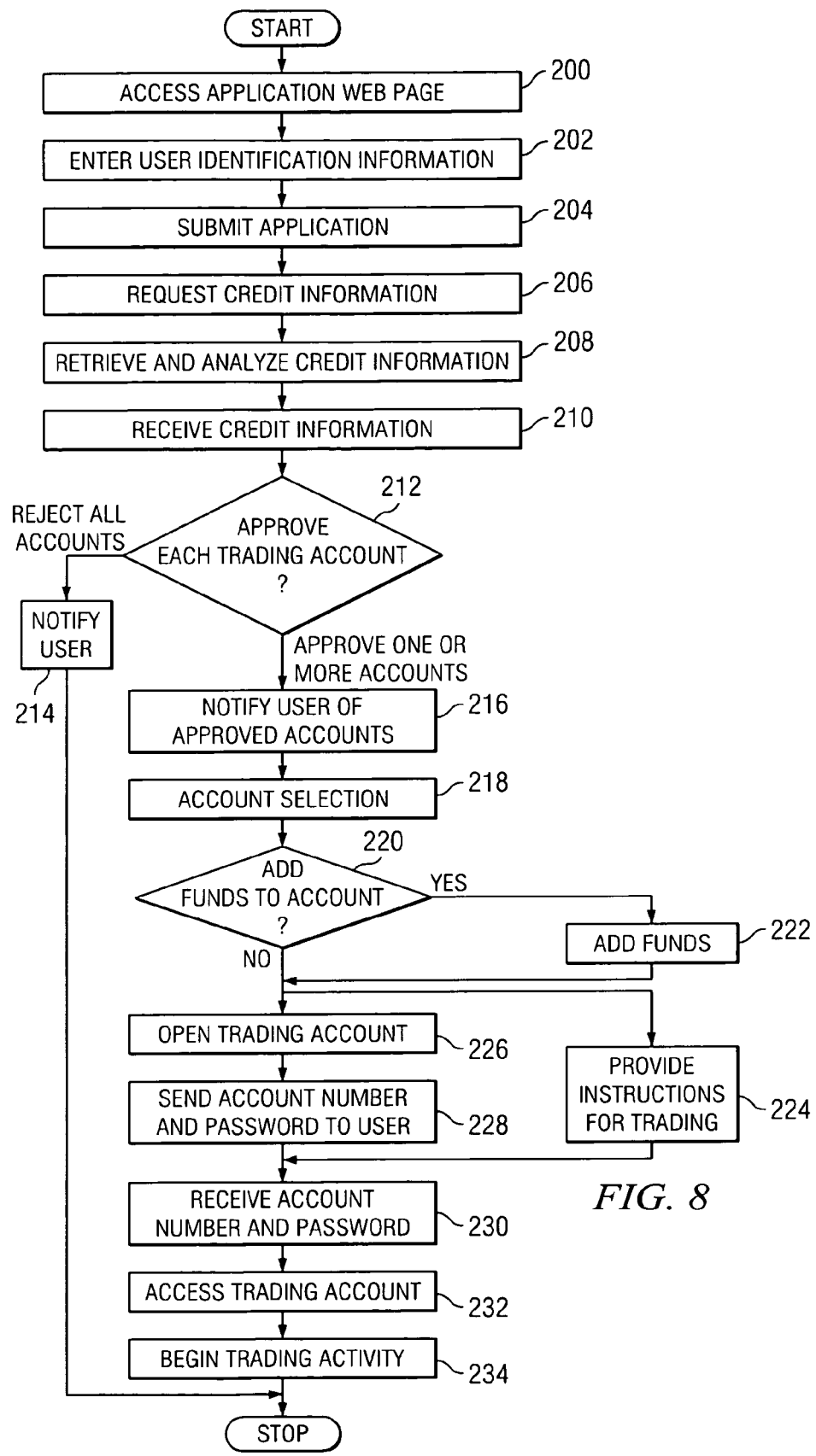
FIG. 8 illustrates one embodiment of a method for providing accounts to users for participation in a trading platform.

FIG. 8 illustrates one embodiment of a method for receiving an application 300 for a trading account 154 from a prospective user of trading platform 20, determining whether to approve the application 300, and opening the approved trading account 154 for the prospective user. At step 200, a prospective user accesses a web page for completing and/or submitting an application 300 for a trading account 154 with trading platform 20, thus establishing a communication session 148 between trading platform 20 and a client 104 associated with the prospective user. For example, the prospective user may click on a link entitled "Apply for an Account" from the home web page of trading platform 20. The prospective user may be presented with an account application 300 that may include one or more web pages, each including one or more information fields.

At step 202, the prospective user enters identification information 302 into various fields in the one or more account application web pages. In one embodiment, the account application 300 comprises a series of web pages in which the prospective user enters identification information 302, such as personal information, address information, employment information, and financial information. A "crumbtrail" may be presented to the prospective user such that the prospective user knows which step of the account application process he or she is in. At step 204, the prospective user is presented with the terms and conditions of trading platform 20. The prospective user accepts the terms and conditions and submits the account application 300, such as by clicking on a "Submit Application" link.

At step 206, credit and identity verification module 130 receives the prospective user's application 300, or at least the prospective user's identification information 302 extracted from the application 300, and communicates a request 304 to a credit verification entity 106 for credit information 308 regarding the prospective user. The credit information request 304 may include some or all of the prospective user's identification information 302. At step 208, the credit verification entity 106 retrieves and analyzes various credit information 308 regarding the prospective user based on the identification information 302 regarding the prospective user received from trading platform 20. Credit verification entity 106 may calculate a credit check score 310 as well as an identity check score 312 for the prospective user based on the retrieved credit information 308 regarding the prospective user. In addition, credit verification entity 106 may organize one or more credit information details 314 regarding the prospective user.

At step 210, the requested credit information 308 (in other words, credit check score 310, identity check score 312, and credit information details 314) is communicated to trading platform 20 via communications network 100. In some embodiments, steps 206 through 210 may be performed in real time or substantially in real time. For example, steps 206 through 210 may be performed in less than or about 60 seconds.

At step 212, account approval module 132 determines whether to approve each of one or more types of trading accounts 154 provided by trading platform 20. Such types of trading accounts 154 may include, for example, a deposit account, a large credit account, a small credit account, and a hybrid credit/deposit account. In particular embodiments, these determinations may be made as described above in greater detail with reference to FIGS. 1-4B. If each type of trading account 154 provided by trading platform 20 is denied by account approval module 132 for the prospective user, account approval module 132 may notify the prospective user of the rejected account application 300 via communications network 100, such as by e-mail or an appropriate web page at step 214. Alternatively, if one or more types of trading accounts 154 are approved by account approval module 132 for the prospective user, account approval module 132 communicates to the prospective user an approval notification 316 indicating the approved account type or types 318, at step 216. This approval notification 316 may be made by an e-mail or an appropriate web page communicated to the prospective user via communications network 100, for example.

At step 218, the prospective user may select his or her desired type of trading account 154, referred to as the user's selected trading account type 320, from the one or more of the approved accounts types 318. For example, the approved account types 318 may be presented to the prospective user by an appropriate web page, and the prospective user may use a pointer to choose the selected trading account type 320 and click on a "Submit" link to submit the selection to trading platform 20. Alternatively, the approved account types 318 may be presented to the prospective user and/or the prospective user may choose the selected trading account type 320 via email communications.

At step 220, balance management module 136 may present the prospective user with a web page offering the prospective user an option to add funds to his or her trading account 154 using an online credit card transaction. If the prospective user accepts the offer, such as by clicking on an "Add Funds" link, balance management module 136 may provide the user an interface (such as a series of web pages, for example) for adding funds to his or her trading account 154 using an online credit card transaction at step 222.

Alternatively, if the prospective user declines the offer to add additional funds by credit card, such as by clicking on a "Do Not Add Funds" link, the method proceeds to steps 224. At step 224, account establishment module 134 may present the user with an explanation or instructions for trading online via trading platform 20. Step 224 is shown in parallel with steps 226 and 228 since step 224 may be performed at least partially simultaneously with steps 226 and 228. For example, steps 226 and 228 may be performed as the user reviews the explanation or instructions presented to the user at step 224. At step 226, account establishment module 134 opens and/or activates the user's trading account 154, such as described above with reference to FIG. 1. This may include creating a set of account identification data 322, which may include an account number and password. At step 228, account establishment module 134 communicates the account number and password to the user via communications network 100, such as by an e-mail or an appropriate web page, for example.

At step 230, the user receives the account number and password for the newly-opened trading account 154. In particular embodiments in which the account number and password are communicated to the user by e-mail, the user may keep his or her web browser 116 open, obtain the received account number and password from the user's e-mail application, and return to the web browser application 116 in order to access the newly-opened trading account 154. For example, this may be possible in a WINDOWS™ or other suitable environment in which multiple applications may be running simultaneously.

At step 232, the user accesses his or her trading account 154 using the received account number and password. For example, the user may enter the account number and password into a login web page for trading platform 20 and click on a "Login" button or link. The user may now begin trading activity using trading platform 20 at step 234, such as researching betting products 150 and placing trading orders 152 to buy or sell such betting products 150 via trading platform 20.

In this manner, trading platform 20 may receive an online application 300 for a trading account 154, determine whether to approve one or more types of trading accounts 154 provided by trading platform 20, notify the prospective user of the results of such determinations, receive a selection from the prospective user of the desired type of trading account 154 to be opened, open the selected type of trading account 154 for the prospective user, and provide the prospective user access to the newly-opened trading account 154. In some embodiments, the account application 300 may be received from a prospective user, trading platform 20 may determine whether to approve each of one or more types of trading accounts 154 provided by trading platform 20, the determined results may be communicated to the prospective user, a desired type of trading account 154 may be selected by the prospective user, and trading platform 20 may open and/or activate the selected type of trading account 154 for the prospective user, all during the same communication session between trading platform 20 and a client 104 associated with the prospective user, such as communication session 148 shown in FIG. 1, for example. In other words, in some embodiments, some or all of steps 200 through 226 may be performed during the same communication session.

In addition, in particular embodiments, trading platform 20 may communicate an account number and password for the newly-opened trading account 154 to the user, the user may receive the account number and password, and the user may access his or her newly-opened trading account 154 using the account number and password all during the same communication session between trading platform 20 and client 104 in which the prospective user submitted the account application 300. In other words, in such embodiments, some or all of steps 200 through 232 may be performed during the same communication session. Further, in particular embodiments, the user may also begin trading activity, such as placing trading orders 152, during the same communication session. In other words, in such embodiments, some or all of steps 200 through 234 may be performed during the same communication session.

Thus, trading platform 20 may receive an application 300 from a prospective user for a trading account 152, determine whether to approve the trading account 152, open the approved trading account 152, and allow the user to begin trading activities using his or her new trading account 152, all during a single communication session and/or in a relatively short period of time. Thus, the prospective user need not mail any information (such as identification information or credit information, for example) to trading platform 20 when applying for trading account 152 (which may comprise a credit account or an account including a credit component, for example), which is commonly required by previous account providers. As a result, the prospective user does not have to experience the significant delays associated with opening accounts with traditional account providers, such as delays associated with mailing information to or from the account provider.

Figure 9:
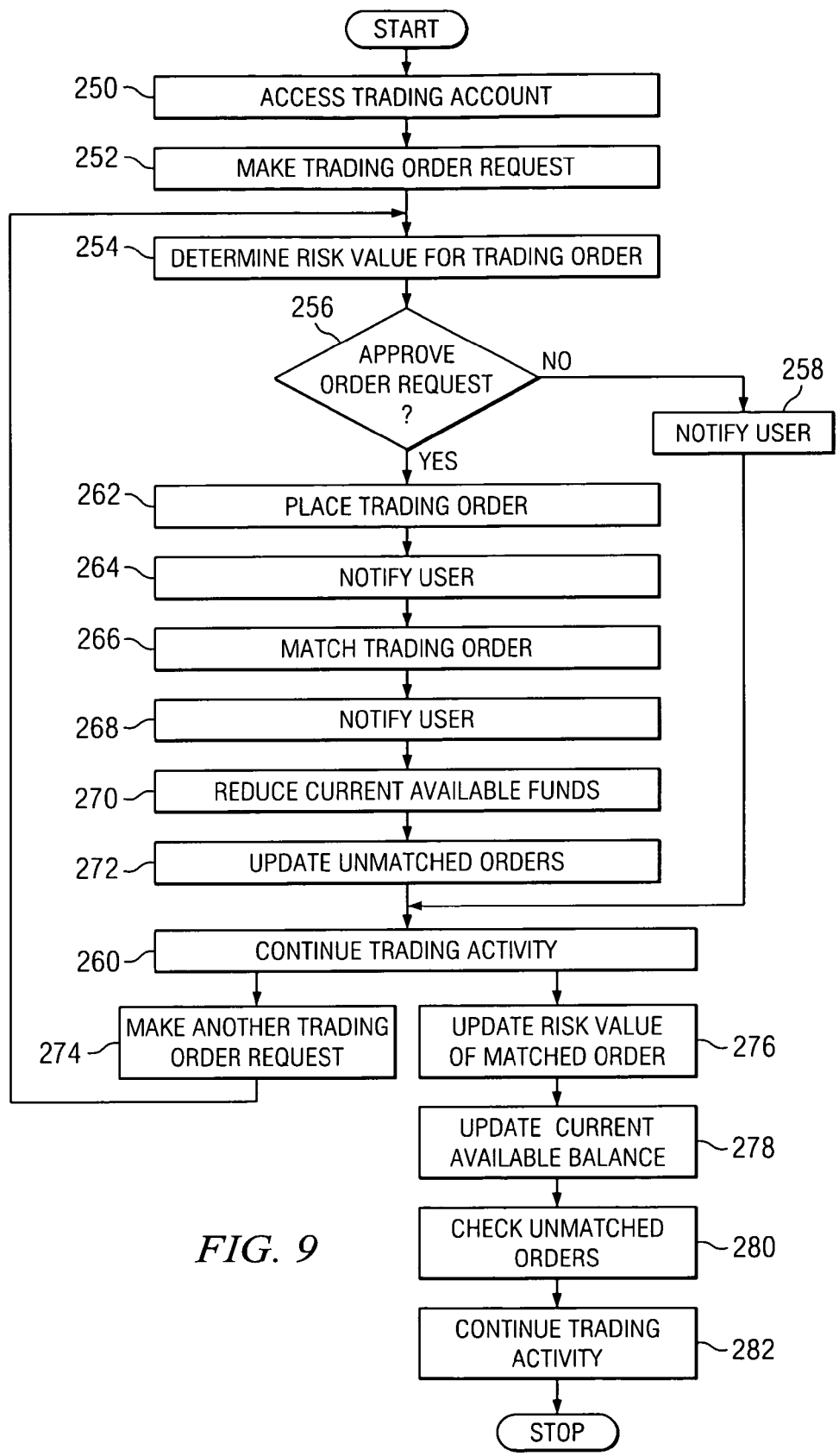
FIG. 9 illustrates one embodiment of a method for trading betting products via the trading platform of FIGS. 1A and 1B.

FIG. 9 illustrates one embodiment of a method for trading betting products 150 via trading platform 20. It should be understood that the method shown in FIG. 9 may continue directly from the method shown in FIG. 8. Thus, in particular embodiments, one, some, or all of the steps shown in FIG. 9 may be performed during the same communication session between trading platform 20 and client 104 (such as communication session 148 shown in FIGS. 1 and 2, for example) as one, some, or all of the steps shown in FIG. 8.

At step 250, a user having a trading account 154 with trading platform 20 accesses his or her trading account 154 using an account number and password, such as described above with reference to step 232 of FIG. 8, for example. At step 252, the user makes a request to place a particular trading order 152 to buy or sell a particular betting product 150. To request the trading order 152, the user may interface with browser application 116 to specify one or more parameters which at least partially define the trading order 152, such as the underlying betting product 150, the offered quote or "price," the unit stake to be wagered, and the duration for which the user wishes the trading order 154 to remain open, for example.

At step 254, order management module 140 determines a risk value 332 for the requested trading order 152, such as described above with reference to FIG. 1. At step 256, order management module 140 determines whether to approve the user's request to place the trading order 152. In some embodiments, this determination may be based at least on one or more current balances 160 in the user's trading account 154 and the risk value 332 determined for the trading order 152. For example, order management module 140 may use the methodology described above with reference to FIGS. 5A through 5E to determine whether to approve or deny the request to place the trading order 152.

If order management module 140 denies the request to place the trading order 152, order management module 140 may notify the user of the denial at step 258, such as by an e-mail or an appropriate web page communicated to the user via communications network 100, for example. The user may then continue trading activity at step 260, such as by making a request to place other trading orders 152.

Alternatively, if order management module 140 approves the trading order request at step 256, order management module 140 may place the trading order 152 on trading platform 20 at step 262. In addition, order management module 140 may notify the user at step 264 that the order request was approved and the order was placed, such as by e-mail or communicating an appropriate web page to the user via communications network 100, for example.

If another trading order 152 exists or is placed which matches the user's trading order 152, trade management module 142 may match the two trading orders 152 to execute a trade at step 266, such as described above with reference to FIG. 1. At step 268, trade management module 142 may notify the user that his or her trading order 152 has been matched (in other words, that a trade has been executed), such as by e-mail or an appropriate web page.

At step 270, balance management module 136 may adjust one or more current balances 160 associated with the user's trading account 154 by an amount equal to the risk value 332 determined for the user's trading order 152 at step 254. In some embodiments, balance management module 136 may update the amount available for trading 620 in the user's trading account 154 as a result of the updated current balances 160.

At step 272, order management module 140 may determine whether to update any of the user's remaining unmatched trading orders 152 based on the updated current balances 160 and/or amount available for trading 620 in the user's trading account 154. For example, order management module 140 may determine whether to reduce the unit stake of particular unmatched trading orders 152 based on the risk value 332 of each unmatched trading order 152 and the amount available for trading 620 in the user's trading account 154, as discussed above with reference to FIG. 1.

The user may continue trading activities at step 260, which may include any variety of activities, such as making requests to place additional trading orders 152, for example. At step 274, the user may make a request to place another trading order 152. The method may return to steps 254 through 272 in order to determine whether to approve the request, place the order, and make the appropriate updates as discussed above.

In some embodiments, the user may place a particular trading order 152 on more than one market at the same time. In addition, in some embodiments, the user may place more than one different trading order 152 at the same time, and on one or more different markets.

At step 276, order management module 140 may update the risk factor 330 of one of the user's executed trading orders 152. For example, product management module 138 may update the risk factor 330 of the betting product 150 underlying the executed trading orders 152 to account for a change in the so-far of the betting product 150, and order management module 140 may update the risk value 332 accordingly.

At step 278, balance management module 136 may update one or more current balances 160 and/or the current amount available for trading 620 in the user's trading account 154 based at least on the updated risk value 332 for the executed trading orders 152.

At step 280, order management module 140 may determine whether to cancel or adjust the unit stake of each of the user's unmatched trading order 152 based at least on the updated current balances 160 and/or updated amount available for trading 620 in the user's trading account 154.

For example, if the updated risk value 332 for any of the user's unmatched trading orders 152 is now greater than the current amount available for trading 620 in the user's trading account 154, order management module 140 may cancel (or at least put on hold) that unmatched trading order 152. Alternatively, order management module 140 may reduce the unit stake for any such unmatched trading order 152 such that the risk value 332 for that trading order 152 is less than or equal to the current amount available for trading 620 in the user's trading account 154. The user may continue trading activities at step 282, which may include any variety of activities, such as making requests to place additional trading orders 152, for example.

FIG. 10 illustrates an example of trading platform 20 acting as an intermediary between users involved in a trade, in accordance with an embodiment of the present invention. As discussed above regarding FIG. 1, in some embodiments, trade management module 142 is generally operable to allow trading platform 20, or trading engine 114, to act as an intermediary or agent between various users having trading accounts 154 with trading platform 20. For example, when trading orders 152 for a particular betting product 150 are matched (in other words, when a trade is executed), trade management module 142 may be operable to establish financial obligations and execute transactions between trading platform 20 and each user involved in the executed trade.

For example, as shown in FIG. 10, suppose a first user, User A, makes a request to place a first trading order 152A to trade a particular betting product 150 at a first quote, or "price." Further suppose that a second user, User B, makes a request to place a second trading order 152B to trade the same betting product 150 at a second quote, or "price." The requests to place trading orders 152A and 152B may be received in any order and at any time relative to each other. Order management module 140 determines whether to approve each trading order 152A and 152B and places each approved trading order 152A and/or 152B in a respective queue 144 on trading platform 20, such as described above with reference to FIGS. 1 and 9.

Assuming both first and second trading orders 152A and 152B were approved and placed on trading platform 20, trade management module 142 may determine whether to match first trading order 152A with second trading order 152B based at least on the quote or price of first trading order 152A and the quote or price of second trading order 152B, as well as the positions of trading orders 152A and 152B in their respective queues with other trading orders 152 for the particular betting product 150.

In some embodiments, trade management module 142 may match first trading order 152A with second trading order 152B if the quote or price of first trading order 152A is equal to or within a predefined amount of the quote or price of second trading order 152B (assuming no other trading orders 152 are higher queued to be matched with first or second trading orders 152A and 152B). In other embodiments, trade management module 142 may match first trading order 152A with second trading order 152B if the quote or price of first trading order 152A and the quote or price of second trading order 152B differ by more than or equal to a predetermined amount. For example, trade management module 142 may only match a trading order 152 to sell a particular betting product 150 at a particular quote or price with a trading order 152 to buy that same betting product 150 at a quote or price greater than the sell quote or price by a predetermined amount, such as 4 points, for example. Thus, using the example 4 point differential, trade management module 142 would only match an order to sell a betting product at a quote or price of 32 points with an order to buy that same betting product at a quote or price of 36 points or higher. In still other embodiments, trade management module 142 may match first trading order 152A with second trading order 152B if the quote or price of first trading order 152A and the quote or price of second trading order 152B differ by less than or equal to a predetermined amount.

When trade management module 142 matches trading order 152A with trading order 152B to execute a trade, trade management module 142 may establish obligations, such as business, contractual and/or financial obligations, between trading platform 20 and each of User A and B. For example, as shown in FIG. 10, trade management module 142 may establish a first set of one or more contractual or financial obligations 360 between trading platform 20 and User A, and a second set of one or more contractual or financial obligations 362 between trading platform 20 and User B. The first set of obligations 360 may be established based at least on the parameters of first trading order 152A, including the underlying betting product 150, the quote or price, the unit stake, and the associated risk value 332 (which may be determined by order management module 140, as discussed above). Obligations 360 may include contractual or financial obligations between User A and trading platform 20 to transfer funds and/or credit between User A and trading platform 20 based at least on first trading order 152A and the potential results of the one or more events (such as a sporting event or tournament, for example) associated with the betting product 150 underlying first and second trading orders 152A and 152B. For example, obligations 360 may include obligations to transfer funds and/or credit between User A's trading account 154A and platform account 155 based on the parameters of first trading order 152A and the potential results of the one or more events associated with the betting product 150 underlying first and second trading orders 152A and 152B.

Similarly, the second set of obligations 362 may be established based at least on the parameters of second trading order 152B, including the underlying betting product 150, the quote or price, the unit stake, and the associated risk value 332. Obligations 362 may include contractual or financial obligations between User B and trading platform 20 to transfer funds and/or credit between User B and trading platform 20 based at least on second trading order 152B and the potential results of the one or more events (such as a sporting event or tournament, for example) associated with the betting product 150 underlying first and second trading orders 152A and 152B. For example, obligations 362 may comprise obligations to transfer funds and/or credit between User B's trading account 154B and platform account 155 based on the parameters of second trading order 152B and the potential results of the one or more events associated with the betting product 150 underlying first and second trading orders 152A and 152B.

As or after the event or events associated with the betting product 150 underlying first and second trading orders 152A and 152B occur, trade management module 142 may receive the results of such event or events. Trade management module 142 may then execute transactions between trading platform 20 and each involved user, Users A and B, based at least on these results. For example, as shown in FIG. 10, trade management module 142 may execute a first transaction 364 between User A's trading account 154A and platform account 155 based on the parameters of first trading order 152A and the results of the one or more events, and a second transaction 366 between User B's trading account 154B and platform account 155 based on the parameters of second trading order 152B and the results of the one or more events.

Transactions 364 and 366 may include, for example, transferring funds or credit between platform account 155 and each involved user, Users A and B. For example, as shown in FIG. 10, if User A and User B place trading orders 152A and 152B to trade a particular betting product 150 regarding a cricket match, and User B is victorious (based on the results of the cricket match), trade management module 142 may execute a first transaction 364 transferring a first amount 368 of funds or credit from User A's trading account 154 to platform account 155, and a second transaction 366 transferring a second amount 370 of funds or credit from platform account 155 to User B's trading account 154. Trading platform 20 may determine first amount 368 based at least on obligations 360 between User A and trading platform 20, and second amount 370 based at least on obligations 362 between User B and trading platform 20. In some situations, first amount 368 and second amount 370 are the same amount. In other situations, first amount 368 and second amount 370 are different amounts. For example, trading platform 20 may retain as profit a difference in amount between first amount 368 and second amount 370.

In some embodiments, trade management module 142 may execute transactions 364 and 366 independently such that each transaction does not depend on the execution of the other. Thus, for example, if first amount 368 is not transferred from User A's trading account 154A to exchange account 155, trade management module 142 may still execute transaction 366 to transfer second amount 370 from exchange account 155 to User B's trading account 154B.

In this manner, trading platform 20 may act as an intermediary for effecting transactions between various users, such as the example Users A and B. In addition, although trade management module 142 creates obligations 360 and 362 and executes separate transactions 364 and 366 with each User A and B, it may appear to each User A and B that that user, User A or B, is transacting directly with the other user, User B or A, respectively. Thus, it may be said that trade management module 142 effectuates a "virtual" transaction, indicated in FIG. 10 as transaction 372 between Users A and B involved in the executed trade.

As discussed above with reference to FIG. 1, although in some embodiments trading platform 20 or trading engine 114 may act as an intermediary or agent between users, in other embodiments trading platform 20 allows users to trade directly with each other, including establishing financial obligations directly with each other.

FIG. 11 illustrates an example method of using trading platform 20 as an intermediary between users involved in a trade in accordance with an embodiment of the present invention. FIG. 11 may be best understood in conjunction with FIG. 10.

At step 400, trading platform 20 receives a request from User A to place a first trading order 152A to buy a unit stake of a particular betting product 150 regarding a football match at a first quote or price. At step 402, order management module 140 approves the request from User A and places first trading order 152A on trading platform 20. At step 404, trading platform 20 receives a request from User B to place a second trading order 152B to sell a unit stake of the particular betting product 150 regarding the football match at a second quote or price. At step 406, order management module 140 approves the request from User B and places second trading order 152B on trading platform 20.

At step 408, trade management module 142 matches (partially or fully, depending on the respective unit stakes of trading orders 152A and 152B) trading order 152A with trading order 152B to execute a trade. At step 410, trade management module 142 establishes one or more contractual or financial obligations 360 between trading platform 20 and User A based at least on the parameters of first trading order 152A and the potential results of the football match. At step 412, trade management module 142 establishes one or more contractual or financial obligations 362 between trading platform 20 and User B based at least on the parameters of second trading order 152B and the potential results of the football match.

At step 414, the football match underlying the particular betting product 150 occurs. At step 416, the results of the football match are communicated to trading platform 20. At step 418, trade management module 142 executes a first transaction 364 between User A's trading account 154A and platform account 155 based on the parameters of first trading order 152A and the results of the football match. For example, supposing based on the results of the football match that User B is successful on the bet, trade management module 142 may transfer a first amount 368 of funds or credit from User A's trading account 154 to platform account 155.

At step 420, trade management module 142 executes a second transaction 366 between User B's trading account 154B and platform account 155 based on the parameters of second trading order 152B and the results of the one or more events. For example, again supposing that User B was successful on the bet, trade management module 142 may transfer a second amount 370 of funds or credit from platform account 155 to User B's trading account 154.

As discussed above, first and second amounts 368 and 370 may be based at least on obligations 360 and 362 and the results of the football match. In addition, first and second amounts 368 may be the same or different amounts. Also, as discussed above, steps 418 and 420 may be executed independently such that execution of each transaction 364 and 366 does not depend on the execution of the other.

Although embodiments of the invention and their advantages are described in detail, a person skilled in the art could make various alterations, additions, and omissions without departing from the spirit and scope of the present invention as defined by the appended claims.

What is claimed is:

1. A method comprising the steps of:
   receiving by at least one computing device from a first user at least two orders, wherein:
      the user has an associated account,
      a first of the two orders comprises a bet on at least one sporting event that has an overall duration,
      a second of the two orders comprises another bet on at least one of (a) the at least one sporting event and (b) another sporting event, and
      the at least two orders are received from the first user via a computer system in use by the first user, the computer system being communicatively coupled to the at least one computing device via a communications network;
   receiving by the at least one computing device from a second user an order, wherein
      the second user's order comprises a bet on the at least one sporting event, and
      wherein the second user's order is received from the second user via a computer system in use by the second user, the computer system in use by the second user being communicatively coupled to the at least one computing device via the communications network;
   matching by the at least one computing device at least a portion of the first user's first order with at least a portion of the second user's order;
   adjusting by the at least one computing device at least one balance associated with the account,
      wherein the adjusting is in response to, at least in part, (a) matching the at least portion of the first user's first order with the at least portion of the second user's order, and (b) event results of the at least one sporting event that occur during the overall duration of the at least one sporting event, and
      wherein the adjusting of the at least one balance results in an adjusted balance; and
   based at least in part on adjusting the at least one balance, automatically adjusting by the at least one computing device a wager amount associated with the first user's second order, the wager amount comprising an amount wagered on the at least one of (a) the at least one sporting event and (b) the another sporting event.

2. The method of claim 1:
   wherein the method further comprises the steps of:
      determining by the at least one computing device a risk value for the first user's first order, wherein the risk value comprises an amount that the first user could lose on the bet on the at least one sporting event;
      approving the first user's first order based at least in part on the risk value; and
      based at least in part on approving the first user's first order, making the first user's first order available for matching with other orders.

3. The method of claim 1,
   wherein the method further comprises the step of determining by the at least one computing device at least one risk factor associated with the at least one sporting event, the risk factor comprising an amount that a user could lose by wagering one unit of currency on the at least one sporting event;
   wherein the first user's first order, when received from the first user, comprises or defines an amount the first user wishes to wager on the at least one sporting event; and
   wherein determining the risk value for the first user's first order comprises multiplying the risk factor by the wager amount for the first user's first order.

4. The method of claim 3, wherein determining the at least one risk factor comprises determining the risk factor based at least in part on an actual maximum tick liability associated with the at least one sporting event and an estimated maximum tick liability associated with the at least one sporting event.

5. The method of claim 4, wherein determining the at least one risk factor comprises selecting a lower of the actual maximum tick liability and the estimated maximum tick liability associated with the at least one sporting event as the risk factor.

6. The method of claim 5, wherein the estimated maximum tick liability is based at least in part on statistical data regarding the at least one sporting event.

7. The method of claim 1,
   wherein the method further comprises the step of:
      based at least in part on the event results and the at least portion of the first user's first order that is matched with the at least portion of the second user's order, updating by the at least one computing device the risk value for the first user's first order, wherein the updating occurs during the overall duration of the at least one sporting event; and
   wherein adjusting the at least one balance associated with the account comprises adjusting the at least one balance by an amount that is based at least in part on the updated risk value for the first user's first order.

8. The method of claim 7,
   wherein the method further comprises the steps of:
      based at least in part on the wager amount associated with the first user's second order, determining by the at least one computing device a risk value for the first user's second order, wherein the risk value comprises an amount that the first user could lose on the another bet; and
      comparing by the at least one computing device the risk value for the first user's second order to at least one of (i) the at least one adjusted balance and (ii) at least one value determined from the at least one adjusted balance; and wherein adjusting the wager amount comprises adjusting the wager amount based at least in part on the comparison.

9. The method of claim 8,
wherein the at least one sporting event has at least one associated risk factor, the risk factor comprising an amount that a user could lose by wagering one unit of currency on the at least one sporting event;
wherein the at least portion of the first user's first order comprises a wager amount associated with the first user's first order;
wherein the risk value for the first user's first order is based at least in part on the risk factor and the wager amount associated with the first user's first order;
wherein the method further comprises the step of:
based at least in part on the event results, updating by the at least one computing device the risk factor, wherein the updating of the risk factor occurs during the overall duration of the at least one sporting event; and
wherein updating the risk value for the first user's first order comprises updating the risk value based at least in part on updating the risk factor.

10. The method of claim 8,
wherein the at least one sporting event has at least one associated risk factor, the risk factor comprising an amount that a user could lose by wagering one unit of currency on the at least one sporting event;
wherein the risk value for the first user's first order is based at least in part on the risk factor;
wherein the method further comprises the step of:
based at least in part on the event results, updating by the at least one computing device the risk factor, wherein the updating of the risk factor occurs during the overall duration of the at least one sporting event; and
wherein updating the risk value for the first user's first order comprises updating the risk value for the first user's first order based at least in part on updating the risk factor.

11. The method of claim 1, wherein matching the at least portion of the first user's first order with the at least portion of the second user's order comprises establishing a bet between the first user and the second user on the at least one sporting event.

12. The method of claim 1,
wherein the first user's second order, when received from the first user, comprises or defines an initial wager amount the first user wishes to wager on the at least one of (a) the at least one sporting event and (b) the another sporting event;
wherein the method further comprises the step of:
based at least in part on matching the at least portion of the first user's first order with the at least portion of the second user's order, automatically reducing by the at least one computing device the initial wager amount, resulting in a reduced wager amount; and
wherein adjusting the wager amount comprises adjusting the reduced wager amount of the first user's second order.

13. The method of claim 12, wherein adjusting the reduced wager amount of the first user's second order comprises at least one of:
further reducing the reduced wager amount, and
increasing the reduced wager amount.

14. The method of claim 13,
wherein the method further comprises the steps of:
based at least in part on the at least portion of the first user's first order that is matched with the at least portion of the second user's order, determining by the at least one computing device a risk value for the first user's first order, wherein the risk value for the first user's first order comprises an amount that the first user could lose on the bet on the at least one sporting event;
based at least in part on matching the at least portion of the first user's first order with the at least portion of the second user's order, reducing by the at least one computing device at least one balance associated with the account by an amount that is based at least in part on the risk value for the first user's first order, the reducing of the at least one balance resulting in a reduced balance;
based at least in part on the initial wager amount of the first user's second order, determining by the at least one computing device a risk value for the first user's second order, wherein the risk value for the first user's second order comprises an amount that the first user could lose on the another bet;
comparing by the at least one computing device the risk value for the first user's second order to at least one of (i) the at least one reduced balance and (ii) at least one value determined from the at least one reduced balance; and
based at least in part on comparing the risk value for the first user's second order to the at least one of (i) the at least one reduced balance and (ii) the at least one value determined from the at least one reduced balance, determining by the at least one computing device that the risk value for the first user's second order exceeds the at least one of (i) the at least one reduced balance and (ii) the at least one value determined from the at least one reduced balance; and
wherein reducing the initial wager amount of the first user's second order comprises reducing the initial wager amount based at least in part on determining that the risk value for the first user's second order exceeds the at least one of (i) the at least one reduced balance and (ii) the at least one value determined from the at least one reduced balance.

15. The method of claim 1, wherein adjusting the wager amount comprises increasing the wager amount.

16. The method of claim 1, wherein adjusting the wager amount comprises reducing the wager amount.

17. The method of claim 1, wherein adjusting the wager amount comprises at least one of:
reducing the wager amount, and
increasing the wager amount.

18. The method of claim 17,
wherein the method further comprises the step of:
based at least in part on the wager amount associated with the first user's second order, determining by the at least one computing device a risk value for the first user's second order, wherein the risk value comprises an amount that the first user could lose on the another bet; and
wherein adjusting the wager amount comprises adjusting the wager amount based at least in part on:
(a) the risk value, and
(b) adjusting the at least one balance.

19. The method of claim 18,
wherein the method further comprises the step of:
comparing by the at least one computing device the risk value for the first user's second order to at least one of (i) the at least one adjusted balance and (ii) at least one value determined from the at least one adjusted balance; and wherein adjusting the wager amount comprises adjusting the wager amount based at least in part on the comparison.

20. The method of claim 19, wherein the method further comprises the step of:

based at least in part on comparing the risk value for the first user's second order to the at least one of (i) the at least one adjusted balance and (ii) the at least one value determined from the at least one adjusted balance, determining by the at least one computing device that the risk value exceeds the at least one of (i) the at least one adjusted balance and (ii) the at least one value determined from the at least one adjusted balance; and wherein adjusting the wager amount associated with the first user's second order comprises reducing the wager amount based at least in part on determining that the risk value exceeds the at least one of (i) the at least one adjusted balance and (ii) the at least one value determined from the at least one adjusted balance.

21. The method of claim 20, wherein reducing the wager amount comprises reducing the wager amount to a reduced amount such that a risk value that is based at least in part on the reduced amount does not exceed the at least one of (i) the at least one adjusted balance and (ii) the at least one value determined from the at least one adjusted balance.

22. The method of claim 20, wherein the method further comprises the step of:

based at least in part on:
(a) the event results of the at least one sporting event that occur during the overall duration of the at least one sporting event, and
(b) the at least portion of the first user's first order that is matched with the at least portion of the second user's order,
determining by the at least one computing device a risk value for the first user's first order, wherein the risk value for the first user's first order comprises an amount that the first user could lose on the bet on the at least one sporting event; and wherein adjusting the at least one balance associated with the account comprises reducing the at least one balance by an amount that is based at least in part on the risk value for the first user's first order.

23. The method of claim 19, wherein the method further comprises the step of:

based at least in part on comparing the risk value for the first user's second order to the at least one of (i) the at least one adjusted balance and (ii) the at least one value determined from the at least one adjusted balance, determining by the at least one computing device that the risk value does not exceed the at least one of (i) the at least one adjusted balance and (ii) the at least one value determined from the at least one adjusted balance; and wherein adjusting the wager amount associated with the first user's second order comprises increasing the wager amount based at least in part on determining that the risk value does not exceed the at least one of (i) the at least one adjusted balance and (ii) the at least one value determined from the at least one adjusted balance.

24. The method of claim 23, wherein increasing the wager amount comprises increasing the wager amount to an increased amount such that a risk value that is based at least in part on the increased amount does not exceed the at least one of (i) the at least one adjusted balance and (ii) the at least one value determined from the at least one adjusted balance.

25. The method of claim 23, wherein the method further comprises the step of:

based at least in part on:
(a) the event results of the at least one sporting event that occur during the overall duration of the at least one sporting event, and
(b) the at least portion of the first user's first order that is matched with the at least portion of the second user's order,
determining by the at least one computing device a risk value for the first user's first order, wherein the risk value for the first user's first order comprises an amount that the first user could lose on the bet on the at least one sporting event; and wherein adjusting the at least one balance associated with the account comprises increasing the at least one balance by an amount that is based at least in part on the risk value for the first user's first order.

26. The method of claim 1, wherein the method further comprises the step of:

based at least in part on:
(a) the event results of the at least one sporting event that occur during the overall duration of the at least one sporting event, and
(b) the at least portion of the first user's first order that is matched with the at least portion of the second user's order,
determining by the at least one computing device a risk value for the first user's first order, wherein the risk value for the first user's first order comprises an amount that the first user could lose on the bet on the at least one sporting event; and wherein adjusting the at least one balance associated with the account comprises adjusting the at least one balance by an amount that is based at least in part on the risk value for the first user's first order.

27. The method of claim 26, wherein adjusting the at least one balance comprises at least one of:

increasing the at least one balance, and decreasing the at least one balance.

28. An apparatus comprising:

at least one processor; and a memory, in which the memory stores instructions which, when executed by the at least one processor, direct the at least one processor to:

receive from a first user at least two orders, wherein:
the user has an associated account,
a first of the two orders comprises a bet on at least one sporting event that has an overall duration,
a second of the two orders comprises another bet on at least one of (a) the at least one sporting event and (b) another sporting event, and
the apparatus is operable to receive the at least two orders from the first user via a computer system in use by the first user, the apparatus being further operable to communicate with the computer system over a communications network;

receive from a second user an order, the second user's order comprising a request to place a bet on the at least one sporting event, and wherein the apparatus is further operable to receive the second user's order from the second user via a computer system in use by the second user;

match at least a portion of the first user's first order with at least a portion of the second user's order;
adjust at least one balance associated with the account,
wherein the adjusting is in response to, at least in part, (a) matching the at least portion of the first user's first order with the at least portion of the second user's order, and (b) event results of the at least one sporting event that occur during the overall duration of the at least one sporting event, and
wherein the adjusting of the at least one balance results in an adjusted balance; and
based at least in part on adjusting the at least one balance, automatically adjust a wager amount associated with the first user's second order, the wager amount comprising an amount wagered on the at least one of (a) the at least one sporting event and (b) the another sporting event.

29. The apparatus of claim 28:
wherein the instructions, when executed by the at least one processor, further direct the at least one processor to:
determine a risk value for the first user's first order, wherein the risk value comprises an amount that the first user could lose on the bet on the at least one sporting event;
approve the first user's first order based at least in part on the risk value; and
based at least in part on approving the first user's first order, make the first user's first order available for matching with other orders.

30. The apparatus of claim 29,
wherein the instructions, when executed by the at least one processor, further direct the at least one processor to determine at least one risk factor associated with the at least one sporting event, the risk factor comprising an amount that a user could lose by wagering one unit of currency on the at least one sporting event;
wherein the first user's first order, when received from the first user, comprises or defines an amount the first user wishes to wager on the at least one sporting event; and
wherein to determine the risk value for the first user's first order comprises to multiply the risk factor by the wager amount for the first user's first order.

31. The apparatus of claim 29,
wherein the instructions, when executed by the at least one processor, further direct the at least one processor to:
based at least in part on the event results and the at least portion of the first user's first order that is matched with the at least portion of the second user's order, update the risk value for the first user's first order, wherein the updating occurs during the overall duration of the at least one sporting event; and
wherein to adjust the at least one balance associated with the account comprises to adjust the at least one balance by an amount that is based at least in part on the updated risk value for the first user's first order.

32. The apparatus of claim 31,
wherein the instructions, when executed by the at least one processor, further direct the at least one processor to:
based at least in part on the wager amount associated with the first user's second order, determine a risk value for the first user's second order, wherein the risk value comprises an amount that the first user could lose on the another bet; and
compare the risk value for the first user's second order to at least one of (i) the at least one adjusted balance and (ii) at least one value determined from the at least one adjusted balance; and
wherein to adjust the wager amount comprises to adjust the wager amount based at least in part on the comparison.

33. The apparatus of claim 32,
wherein the at least one sporting event has at least one associated risk factor, the risk factor comprising an amount that a user could lose by wagering one unit of currency on the at least one sporting event;
wherein the at least portion of the first user's first order comprises a wager amount associated with the first user's first order;
wherein the risk value for the first user's first order is based at least in part on the risk factor and the wager amount associated with the first user's first order;
wherein the instructions, when executed by the at least one processor, further direct the at least one processor to:
based at least in part on the event results, update the risk factor, wherein the updating of the risk factor occurs during the overall duration of the at least one sporting event; and
wherein to update the risk value for the first user's first order comprises to update the risk value based at least in part on updating the risk factor.

34. The apparatus of claim 32,
wherein the at least one sporting event has at least one associated risk factor, the risk factor comprising an amount that a user could lose by wagering one unit of currency on the at least one sporting event;
wherein the risk value for the first user's first order is based at least in part on the risk factor;
wherein the instructions, when executed by the at least one processor, further direct the at least one processor to:
based at least in part on the event results, update the risk factor, wherein the updating of the risk factor occurs during the overall duration of the at least one sporting event; and
wherein to update the risk value for the first user's first order comprises to update the risk value for the first user's first order based at least in part on updating the risk factor.

35. The apparatus of claim 28, wherein to match the at least portion of the first user's first order with the at least portion of the second user's order comprises to establish a bet between the first user and the second user on the at least one sporting event.

36. The apparatus of claim 28,
wherein the first user's second order, when received from the first user, comprises or defines an initial wager amount the first user wishes to wager on the at least one of (a) the a least one sporting event and (b) the another sporting event;
wherein the instructions, when executed by the at least one processor, further direct the at least one processor to:
based at least in part on matching the at least portion of the first user's first order with the at least portion of the second user's order, automatically reduce the initial wager amount, resulting in a reduced wager amount; and
wherein to adjust the wager amount comprises to adjust the reduced wager amount of the first user's second order.

37. The apparatus of claim 36, wherein to adjust the reduced wager amount of the first user's second order comprises at least one of:
to further reduce the reduced wager amount, and
to increase the reduced wager amount.

38. The apparatus of claim 37,
wherein the instructions, when executed by the at least one processor, further direct the at least one processor to:

based at least in part on the at least portion of the first user's first order that is matched with the at least portion of the second user's order, determine a risk value for the first user's first order, wherein the risk value for the first user's first order comprises an amount that the first user could lose on the bet on the at least one sporting event;

based at least in part on matching the at least portion of the first user's first order with the at least portion of the second user's order, reduce at least one balance associated with the account by an amount that is based at least in part on the risk value for the first user's first order, the reducing of the at least one balance resulting in a reduced balance;

based at least in part on the initial wager amount of the first user's second order, determine a risk value for the first user's second order, wherein the risk value for the first user's second order comprises an amount that the first user could lose on the another bet;

compare the risk value for the first user's second order to at least one of (i) the at least one reduced balance and (ii) at least one value determined from the at least one reduced balance; and based at least in part on comparing the risk value for the first user's second order to the at least one of (i) the at least one reduced balance and (ii) the at least one value determined from the at least one reduced balance, determine that the risk value for the first user's second order exceeds the at least one of (i) the at least one reduced balance and (ii) the at least one value determined from the at least one reduced balance; and wherein to reduce the initial wager amount of the first user's second order comprises to reduce the initial wager amount based at least in part on determining that the risk value for the first user's second order exceeds the at least one of (i) the at least one reduced balance and (ii) the at least one value determined from the at least one reduced balance.

39. The apparatus of claim 28, wherein to adjust the wager amount comprises to increase the wager amount.

40. The apparatus of claim 28, wherein to adjust the wager amount comprises to reduce the wager amount.

41. The apparatus of claim 28, wherein to adjust the wager amount comprises at least one of:
to reduce the wager amount, and
to increase the wager amount.

42. The apparatus of claim 41,
wherein the instructions, when executed by the at least one processor, further direct the at least one processor to:
based at least in part on the wager amount associated with the first user's second order, determine a risk value for the first user's second order, wherein the risk value comprises an amount that the first user could lose on the another bet; and
wherein to adjust the wager amount comprises to adjust the wager amount based at least in part on:
(a) the risk value, and
(b) adjusting the at least one balance.

43. The apparatus of claim 42,
wherein the instructions, when executed by the at least one processor, further direct the at least one processor to:
compare the risk value for the first user's second order to at least one of (i) the at least one adjusted balance and (ii) at least one value determined from the at least one adjusted balance; and
wherein to adjust the wager amount comprises to adjust the wager amount based at least in part on the comparison.

44. The apparatus of claim 43,
wherein the instructions, when executed by the at least one processor, further direct the at least one processor to:
based at least in part on comparing the risk value for the first user's second order to the at least one of (i) the at least one adjusted balance and (ii) the at least one value determined from the at least one adjusted balance, determine that the risk value exceeds the at least one of (i) the at least one adjusted balance and (ii) the at least one value determined from the at least one adjusted balance; and
wherein to adjust the wager amount associated with the first user's second order comprises to reduce the wager amount based at least in part on determining that the risk value exceeds the at least one of (i) the at least one adjusted balance and (ii) the at least one value determined from the at least one adjusted balance.

45. The apparatus of claim 44, wherein to reduce the wager amount comprises to reduce the wager amount to a reduced amount such that a risk value that is based at least in part on the reduced amount does not exceed the at least one of (i) the at least one adjusted balance and (ii) the at least one value determined from the at least one adjusted balance.

46. The apparatus of claim 44,
wherein the instructions, when executed by the at least one processor, further direct the at least one processor to:
based at least in part on:
(a) the event results of the at least one sporting event that occur during the overall duration of the at least one sporting event, and
(b) the at least portion of the first user's first order that is matched with the at least portion of the second user's order,
determine a risk value for the first user's first order, wherein the risk value for the first user's first order comprises an amount that the first user could lose on the bet on the at least one sporting event; and
wherein to adjust the at least one balance associated with the account comprises to reduce the at least one balance by an amount that is based at least in part on the risk value for the first user's first order.

47. The apparatus of claim 43,
wherein the instructions, when executed by the at least one processor, further direct the at least one processor to:
based at least in part on comparing the risk value for the first user's second order to the at least one of (i) the at least one adjusted balance and (ii) the at least one value determined from the at least one adjusted balance, determine that the risk value does not exceed the at least one of (i) the at least one adjusted balance and (ii) the at least one value determined from the at least one adjusted balance; and
wherein to adjust the wager amount associated with the first user's second order comprises to increase the wager amount based at least in part on determining that the risk value does not exceed the at least one of (i) the at least one adjusted balance and (ii) the at least one value determined from the at least one adjusted balance.

48. The apparatus of claim 47, wherein to increase the wager amount comprises to increase the wager amount to an increased amount such that a risk value that is based at least in part on the increased amount does not exceed the at least one of (i) the at least one adjusted balance and (ii) the at least one value determined from the at least one adjusted balance.

49. The apparatus of claim 47,
wherein the instructions, when executed by the at least one processor, further direct the at least one processor to:

based at least in part on:
- (a) the event results of the at least one sporting event that occur during the overall duration of the at least one sporting event, and
- (b) the at least portion of the first user's first order that is matched with the at least portion of the second user's order, determine a risk value for the first user's first order, wherein the risk value for the first user's first order comprises an amount that the first user could lose on the bet on the at least one sporting event; and wherein to adjust the at least one balance associated with the account comprises to increase the at least one balance by an amount that is based at least in part on the risk value for the first user's first order.

50. The apparatus of claim 28, wherein the instructions, when executed by the at least one processor, further direct the at least one processor to:

based at least in part on:
- (a) the event results of the at least one sporting event that occur during the overall duration of the at least one sporting event, and
- (b) the at least portion of the first user's first order that is matched with the at least portion of the second user's order, determine a risk value for the first user's first order, wherein the risk value for the first user's first order comprises an amount that the first user could lose on the bet on the at least one sporting event; and wherein to adjust the at least one balance associated with the account comprises to adjust the at least one balance by an amount that is based at least in part on the risk value for the first user's first order.

51. The apparatus of claim 50, wherein to adjust the at least one balance comprises at least one of:

to increase the at least one balance, and to decrease the at least one balance.

* * * * *